(12) United States Patent
Kim et al.

(10) Patent No.: US 11,508,166 B2
(45) Date of Patent: Nov. 22, 2022

(54) METHOD AND SYSTEM FOR PROVIDING INFORMATION ABOUT OBJECTS IN REFRIGERATOR

(71) Applicant: SAMSUNG ELECTRONICS CO., LTD., Suwon-si (KR)

(72) Inventors: Jaehwan Kim, Suwon-si (KR); Taehoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 16/664,152

(22) Filed: Oct. 25, 2019

(65) Prior Publication Data
US 2020/0134291 A1    Apr. 30, 2020

(30) Foreign Application Priority Data

Oct. 25, 2018    (KR) .................. 10-2018-0128326

(51) Int. Cl.
*G06V 20/64* (2022.01)
*G06F 16/538* (2019.01)
(Continued)

(52) U.S. Cl.
CPC .............. *G06V 20/64* (2022.01); *F25D 11/00* (2013.01); *G06F 3/04845* (2013.01);
(Continued)

(58) Field of Classification Search
CPC ............. G06K 9/00201; G06K 9/2063; G06K 9/00671; G06K 2209/17; G06F 16/538; G06F 3/04845; G06F 3/167; G06F 3/0488; G06F 3/0484; G06F 3/005; G06F 3/0482; F25D 11/00; F25D 2400/361;
(Continued)

(56) References Cited

U.S. PATENT DOCUMENTS 9,965,798 B1 * 5/2018 Vaananen ............ F25D 27/005
10,184,715 B2   1/2019 Kim et al.
(Continued)

FOREIGN PATENT DOCUMENTS

CN    107477971 A    12/2017
CN    107796168 A    3/2018
(Continued)

OTHER PUBLICATIONS

International Search Report and Written Opinion (PCT/ISA/210 and PCT/ISA/237), dated Jan. 30, 2020 issued by International Searching Authority in International Application No. PCT/KR2019/012599.

(Continued)

*Primary Examiner* — Angie Badawi
(74) *Attorney, Agent, or Firm* — Sughrue Mion, PLLC

(57) ABSTRACT

A method of providing information about an object in a refrigerator is provided. The method includes: obtaining, using a camera, an image of a plurality of objects stored in the refrigerator; displaying the image on a display of the refrigerator; receiving a first user input indicating a first object from among the plurality of objects included in the image; and displaying a substitute image of the first object on the display based on the first user input.

16 Claims, 28 Drawing Sheets

(51) Int. Cl.
  *F25D 11/00* (2006.01)
  *G06F 3/04845* (2022.01)
  *G06V 10/22* (2022.01)

(52) U.S. Cl.
  CPC .......... *G06F 16/538* (2019.01); *G06V 10/225* (2022.01); *F25D 2400/361* (2013.01); *F25D 2700/06* (2013.01)

(58) Field of Classification Search
  CPC .. F25D 2700/06; F25D 29/00; F25D 2500/06; F25D 2400/36; G06T 19/006
  See application file for complete search history.

(56) References Cited

U.S. PATENT DOCUMENTS

| | | | |
|---|---|---|---|
| 2010/0283573 A1* | 11/2010 | Yum | G06Q 10/087 340/3.1 |
| 2012/0288186 A1* | 11/2012 | Kohli | G06K 9/6255 382/159 |
| 2014/0358287 A1 | 12/2014 | Lee et al. | |
| 2015/0161871 A1 | 6/2015 | Kim | |
| 2016/0104226 A1* | 4/2016 | Choi | G06Q 30/0643 705/26.61 |
| 2016/0138857 A1 | 5/2016 | Klingshirn | |
| 2016/0217417 A1* | 7/2016 | Ma | H04N 5/225 |
| 2017/0038924 A1 | 2/2017 | Okuma et al. | |
| 2017/0213184 A1* | 7/2017 | Lee | H04N 7/18 |
| 2018/0059881 A1 | 3/2018 | Agboatwalla et al. | |
| 2018/0068476 A1* | 3/2018 | Ono | G06F 3/013 |
| 2018/0101736 A1 | 4/2018 | Han et al. | |
| 2018/0187943 A1 | 7/2018 | Woo et al. | |
| 2018/0187969 A1* | 7/2018 | Kim | F25D 29/005 |
| 2019/0114783 A1* | 4/2019 | Iwamoto | G06T 7/20 |

FOREIGN PATENT DOCUMENTS

| | | |
|---|---|---|
| JP | 2017-036108 A | 2/2017 |
| KR | 10-2014-0139736 A | 12/2014 |
| KR | 10-2015-0118864 A | 10/2015 |
| KR | 10-2018-0039924 A | 4/2018 |

OTHER PUBLICATIONS

Communication dated Jun. 7, 2021, issued by the European Patent Office in European Application No. 19875658.7.

* cited by examiner

FIG. 3
REGISTERED OBJECT LIST (300)
| | OBJECT IMAGE (301) | ITEM NAME (302) | EXPIRATION DATE (303) |
|---|---|---|---|
| 1 |  | STEAK SAUCE | 2020.12.31 |
| 2 | 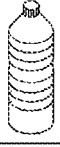 | MINERAL WATER | 2019.02.03 |
| 3 | 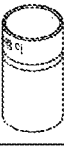 | CAN OF WHELKS | 2022.03.19 |
| 4 |  | LACTIC BEVERAGE | 2018.10.30 |
| ⋮ | ⋮ | ⋮ | ⋮ |

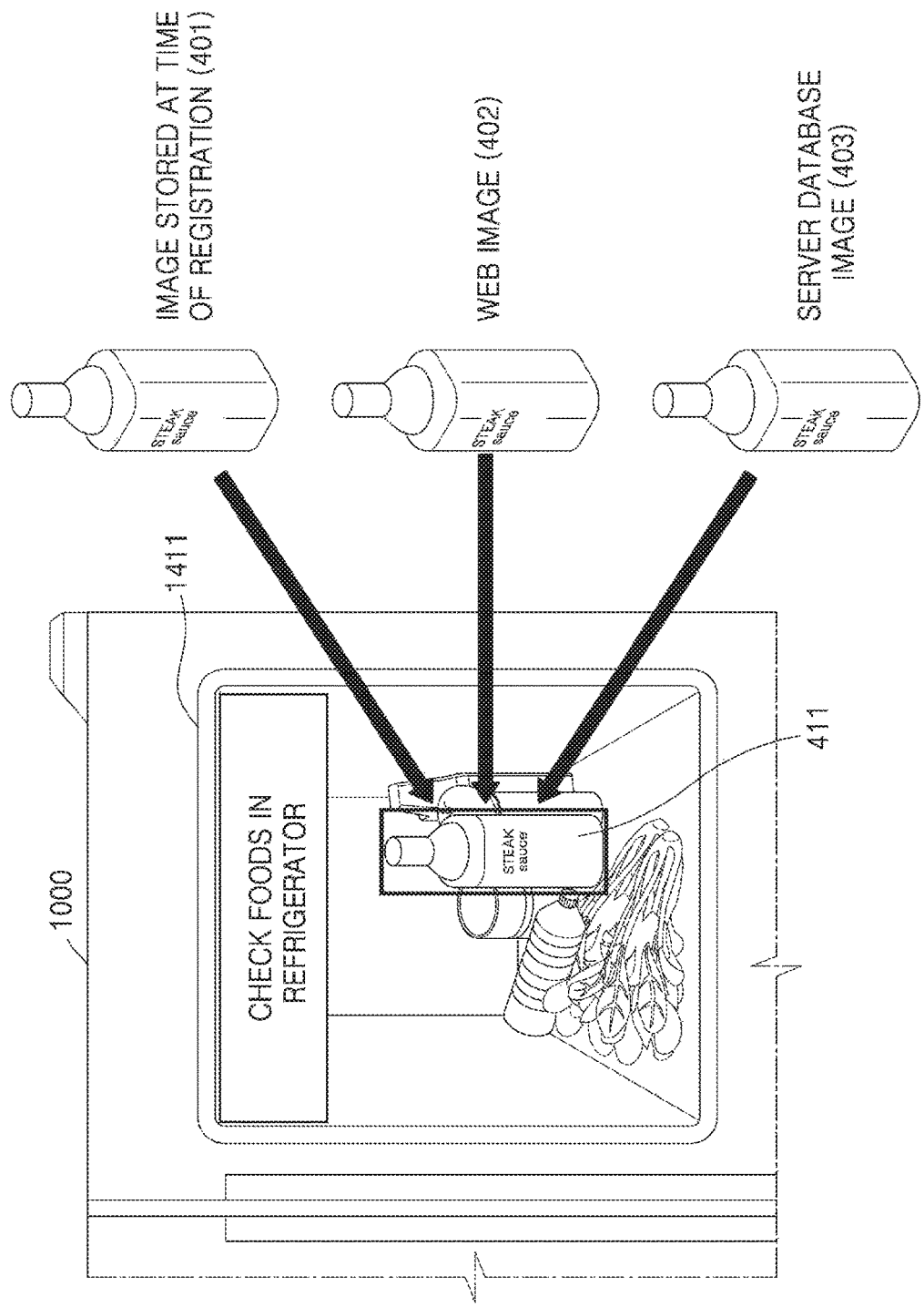

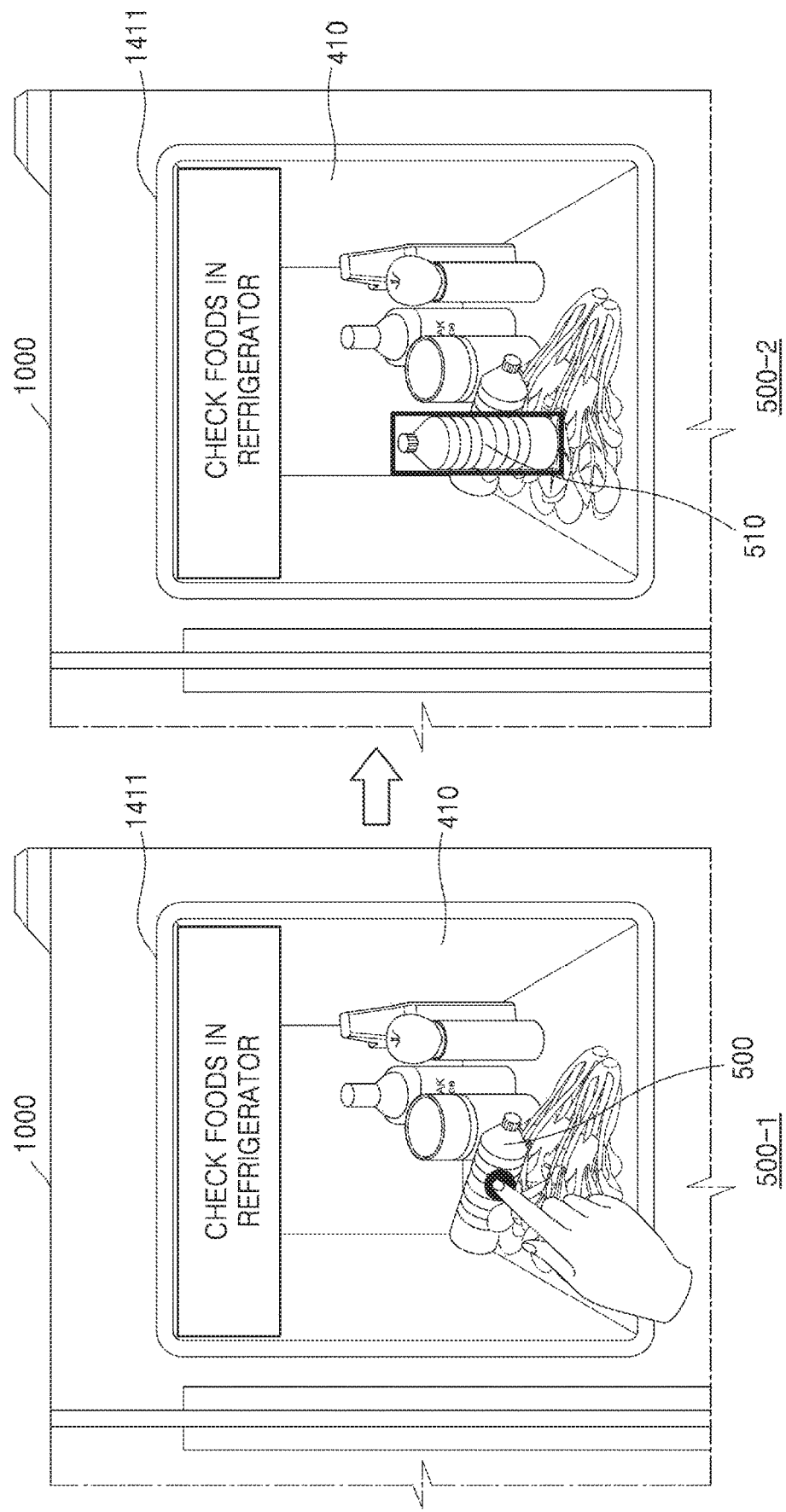

METHOD AND SYSTEM FOR PROVIDING INFORMATION ABOUT OBJECTS IN REFRIGERATOR

CROSS-REFERENCE TO RELATED APPLICATION

This application is based on and claims priority under 35 U.S.C. § 119 to Korean Patent Application No. 10-2018-0128326, filed on Oct. 25, 2018, in the Korean Intellectual Property Office, the disclosure of which is incorporated by reference herein in its entirety.

BACKGROUND

1. Field

The disclosure relates to a method and system for providing information about an object stored in a refrigerator.

2. Description of Related Art

Augmented reality research began in the 1960s when the first see-through head-mounted display (HMD) was developed. Subsequently, in the early 1990s, the term 'Augmented Reality' was coined, and research on augmented reality began.

Augmented reality platforms have evolved from desktop computers to smartphones. Augmented reality was initially implemented around personal computers (PCs). Since 2000, personal digital assistants (PDAs), ultra-mobile personal computers (UMPCs) and mobile phones have become popular, and platforms for mobile augmented reality have diversified. In addition, since 2009, with the spread of smartphones, mobile augmented reality has been developed. Smartphones are attracting attention as augmented reality platforms because the smartphones are equipped with various sensors, such as a compact and lightweight global positioning system (GPS), a compass, a magnetic sensor, an acceleration sensor, a touch sensor, a proximity sensor, an illuminance sensor, WiFi, and radio frequency identification (RFID), in addition to a camera and thus provide, in real time, additional information, which may be used to identify commands or intentions, in addition to a user's location.

Augmented reality platforms continue to evolve, and include wearable devices, such as a pair of glasses, which do not require a smart phone to be held. At the same time, the progress of core technologies, such as Internet of Things (IoT), computer vision, realistic contents, and artificial intelligence, is raising expectations for various applications of augmented reality.

SUMMARY

Provided are a method and system for enabling information about an object in a refrigerator to be confirmed through a display unit of the refrigerator even when a user does not open the door of the refrigerator. Provided are a method and system for providing various information about an object in a refrigerator through an augmented reality (AR) technique.

Provided are a method and system for allowing a user to easily identify the contents of containers (e.g., translucent containers) in a refrigerator by displaying identification images (e.g., icons), which respectively represent the contents of the containers stored in the refrigerator, on a camera image captured by photographing the inside of the refrigerator.

Additional aspects will be set forth in part in the description which follows and, in part, will be apparent from the description, or may be learned by practice of the presented embodiments of the disclosure.

According to an embodiment of the disclosure, a method of providing information about an object in a refrigerator includes: obtaining, using a camera, an image of a plurality of objects stored in the refrigerator; displaying the image on a display of the refrigerator; receiving a first user input indicating a first object from among the plurality of objects included in the image; and displaying a substitute image of the first object on the display based on the first user input.

The displaying of the substitute image of the first object may include: retrieving a representative image corresponding to the first object; and displaying the representative image on the display as the substitute image.

The displaying of the substitute image of the first object may include: superimposing and displaying the substitute image of the first object on the display at a location of the image that corresponds to the first object.

The method may further include: receiving a second user input; and displaying a rotated substitute image on the display based on the second user input.

The method may further include: receiving a third user input; and displaying detailed information about the first object on the display based on the third user input.

The method may further include: identifying at least one object of which an expiration date is within a preset time limit from among the plurality of objects; and displaying, on the image displayed on the display, information indicating the expiration date and the at least one object.

According to an embodiment of the disclosure, a refrigerator includes: a camera configured to obtain an image of a plurality of objects stored in the refrigerator; a display configured to display the image; a user input interface configured to receive a first user input indicating a first object from among the plurality of objects included in the image; and a processor configured to display a substitute image of the first object on the display based on the first user input.

The processor may be further configured to: retrieve a representative image corresponding to the first object; and display the representative image on the display as the substitute image.

The processor may be further configured to superimpose and display the substitute image of the first object on the first object of the image on the display.

The processor may be further configured to: receive, through the user input interface, a second user input; and display a rotated substitute image on the display based on the second user input.

The processor may be further configured to: receive, through the user input interface, a third user input; and display detailed information about the first object on the display based on the third user input.

The processor may be further configured to: identify at least one object of which an expiration date is within a preset time limit from among the plurality of objects; and display, on the image displayed on the display, information indicating the expiration date and the at least one object.

According to an embodiment of the disclosure, a non-transitory computer readable recording medium storing a program for executing a method for controlling a refrigerator that includes a camera and a display, the method including: obtaining, using the camera, an image of a plurality of objects stored in the refrigerator; displaying the image on the display; receiving a first user input indicating a first object from among the plurality of objects included in the image; and displaying a substitute image of the first object on the display based on the first user input.

The displaying of the substitute image of the first object may include: retrieving a representative image corresponding to the first object; and displaying the representative image on the display as the substitute image.

The displaying of the substitute image of the first object may include superimposing and displaying the substitute image of the first object on the display at a location of the image that corresponds to the first object.

The method may further include: receiving a second user input; and displaying a rotated substitute image on the display based on the second user input.

The method may further include: receiving a third user input; and displaying detailed information about the first object on the display based on the third user input.

The method may further include: identifying at least one object of which an expiration date is within a preset time limit from among the plurality of objects; and displaying, on the image displayed on the display, information indicating the expiration date and the at least one object.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view for explaining a registered object list according to an embodiment;

FIGS. 4A, 4B, 4C, and 5 are views for explaining an operation in which a refrigerator displays a substitute image of an object on a display unit according to an embodiment;

DETAILED DESCRIPTION

Figure 1:
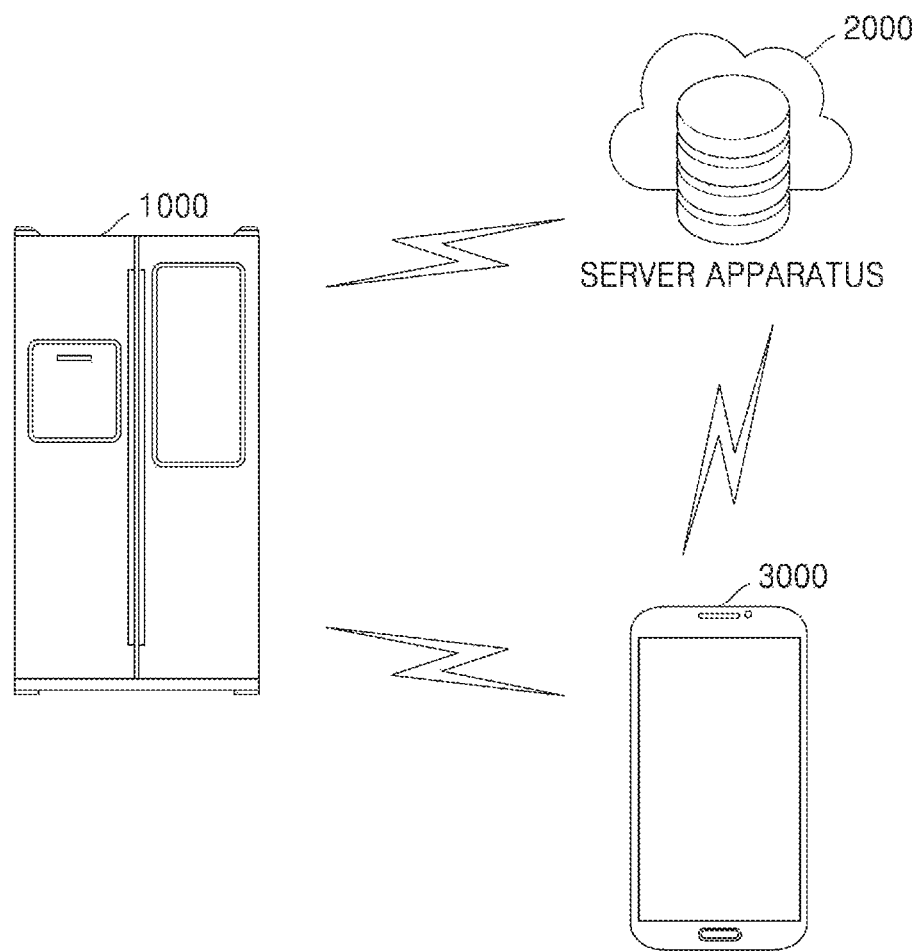
FIG. 1 is a view for explaining a system for providing information about an object in a refrigerator according to an embodiment.

The terms used in this specification will be briefly described and embodiments of the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the specification, when a part "includes" an element, it is to be understood that the part additionally includes other elements rather than excluding other elements as long as there is no particular opposing recitation. Also, the terms described in the specification, such as "unit," "module," etc., denote a unit processing at least one function or operation, which may be implemented as hardware or software or a combination thereof.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure. Like reference numerals in the drawings denote like elements.

Throughout the disclosure, the expression "at least one of a, b or c" indicates only a, only b, only c, both a and b, both a and c, both b and c, or all of a, b, and c.

FIG. 1 is a view for explaining an information provision system for providing information about an object in a refrigerator, according to an embodiment.

Referring to FIG. 1, the information provision system may provide information about the object in the refrigerator and, according to an embodiment, may include a refrigerator 1000, a server apparatus 2000, and a mobile terminal 3000. According to other embodiments, the information provision system may be realized by including more components than the illustrated components or by including less components than the illustrated components. For example, the information provision system may be realized by including the refrigerator 1000 and the server apparatus 2000, by including the refrigerator 1000 and the mobile terminal 3000, or by including only the refrigerator 1000. Each of the components will be described.

The refrigerator 1000 according to an embodiment may be an electronic device (or a home appliance device) for refrigerating or freezing food. The refrigerator 1000 may store not only the food, but also medicines, alcoholic liquors, cosmetics, etc.

The refrigerator 1000 according to an embodiment may provide information about an object stored in the refrigerator 1000. In this specification, the object is an element which may be stored in the refrigerator 1000 and may include, for example, food (e.g., fresh food items, such as fruits, vegetables, etc., cooked food items, processed products, condiments, and retort foods), containers for storing side dishes or foods (e.g., translucent containers, transparent containers, and opaque containers), drinking water (e.g., mineral water, carbonated water, yoghurt, coffee, and milk), canned food, sauces (e.g., ketchup, mayonnaise, salad dressing, and steak sauce), medicines, alcoholic liquors, cosmetics, etc., but embodiments are not limited thereto.

According to an embodiment, the refrigerator 1000 may be equipped with at least one camera for identifying an inner space of the refrigerator 1000. The refrigerator 1000 may obtain an image of an object kept on each shelf by using the at least one camera. According to an embodiment, the refrigerator 1000 may include a display unit (e.g., display device). Therefore, the refrigerator 1000 may display an image obtained through at least one camera on the display unit. In this case, even when the door of the refrigerator 1000 is not opened, users may identify the object stored in the refrigerator 1000.

In the case where a first object on the image is partially obscured by a second object on the image, when a user selects the first object, the refrigerator 1000 may display a substitute image of the first object on the image. In this case, the user may clearly identify the first object partially obscured by the second object. An operation, performed by the refrigerator 1000, of displaying a substitute image of an object will be described in more detail below with reference to FIG. 2.

According to an embodiment, the refrigerator 1000 may display, on the display unit, identification images (e.g., icons) for respectively identifying the contents of the containers contained in the image. An operation, performed by the refrigerator 1000, of displaying identification images (e.g., icons) on an image will be described in detail below with reference to FIG. 12.

According to another embodiment, the refrigerator 1000 may provide the information about the object to the user via the mobile terminal 3000 with respect to which a communication link is established. An operation, performed by the refrigerator 1000, of providing the information about the object stored in the refrigerator 1000 via the mobile terminal 3000 will be described in detail below with reference to FIG. 21.

According to an embodiment, the refrigerator 1000 may sense a voice input or a touch input from the user. In this specification, "touch input" denotes a gesture or the like performed by the user on a touch screen to control the refrigerator 1000. For example, the touch input described herein may include a tap, a touch & hold, a double tap, a drag, a pinch, a drag and drop, and the like.

The "tap" indicates an operation in which the user touches the touch screen by using a finger or a touch tool (e.g., an electronic pen) and then immediately lifts it from the touch screen without moving.

The "touch & hold" indicates an operation in which the user touches the touch screen by using a finger or a touch tool (e.g., an electronic pen) and then maintains the touch input for a critical time (e.g., 2 seconds) or more. For example, the "touch & hold" denotes a case in which a time difference between a touch-in time point and a touch-out time point is equal to or greater than the critical time (e.g., 2 seconds). In order to allow the user to recognize whether the touch input is a tap or a touch & hold, a feedback signal may be provided visually, audibly or tactually when the touch input is maintained for the critical time or more. The critical time may vary depending on the implementation.

The "double tap" indicates an operation in which the user touches the touch screen twice by using a finger or a touch tool such as a stylus.

The "drag" denotes an operation in which the user moves a finger or a touch tool to another position on the touch screen while holding a touch after touching the touch screen by using the finger or the touch tool. Due to the drag operation, an object is moved or a panning operation to be described later is performed.

The "drag & drop" denotes an operation in which the user drags an object to a predetermined position on the touch screen by using a finger or a touch tool and then releases the object.

The "pinch" indicates an operation in which the user moves two fingers in different directions while touching the touch screen by using the two fingers. The "pinch" is a gesture for pinch opening or pinch closing of an object or a page, and a pinch opening value or a pinch closing value is determined according to the distance between the two fingers.

The "swipe" is an operation of moving an object by a certain distance in a horizontal or vertical direction while touching the object on the touch screen by using a finger or a touch tool.

According to an embodiment, the refrigerator 1000 may include an artificial intelligence (AI) model for tracking a moving position of an object in the refrigerator 1000 and recognizing a new object. According to an embodiment, the refrigerator 1000 may directly generate or refine the AI model by using learning data. Also, the refrigerator 1000 may receive an AI model trained by the server apparatus 2000 from the server apparatus 2000 and store the AI model.

According to an embodiment, the refrigerator 1000 may include a communication interface for performing communication with an external device. According to an embodiment, the refrigerator 1000 may perform communication with the server apparatus 2000 or the mobile terminal 3000 through the communication interface. The communication interface may include a short-range wireless communication interface, a mobile communication interface, etc. The short-range wireless communication interface may include, but is not limited to, a Bluetooth communication interface, a Bluetooth low energy (BLE) communication interface, a near field communication interface, a WLAN (Wi-Fi) communication interface, a Zigbee communication interface, an infrared data association (IrDA) communication interface, a Wi-Fi direct (WFD) communication interface, an ultra-wideband (UWB) communication interface, an Ant+ communication interface.

According to an embodiment, the server apparatus 2000 may include an AI processor. The AI processor may train an artificial neural network to generate an AI model for tracking a moving position of an object and recognizing a new object To "train" the artificial neural network may denote to generate an arithmetic model, in which connection of neurons constituting the artificial neural network is capable of performing optimal decision, while appropriately changing the weight based on data.

According to an embodiment, the server apparatus 2000 may include a communication interface for performing communication with an external device. According to an embodiment, the server apparatus 2000 may perform communication with the refrigerator 1000 or the mobile terminal 3000 through the communication interface. According to an embodiment, the refrigerator 1000 may transmit identification information of the refrigerator 1000 or identification information (login information) of a user to the server apparatus 2000 and may access the server apparatus 2000 by receiving authentication with respect to the identification information of the refrigerator 1000 or the identification information (login information) of the user from the server apparatus 2000.

The mobile terminal 3000 may be a device connected with the refrigerator 1000 with the same account information. The mobile terminal 3000 may be directly connected with the refrigerator 1000 via a short-range communication link or may be indirectly connected with the refrigerator 1000 via the server apparatus 2000.

The mobile terminal 3000 according to an embodiment may be realized in various forms. For example, the mobile terminal 3000 described in this specification may include, but is not limited to, a digital camera, a smartphone, a laptop computer, a tablet personal computer (PC), an electronic book terminal, a digital broadcasting terminal, a personal digital assistant (PDA), a portable multimedia player (PMP), a navigation apparatus, an MP3 player. For example, the mobile terminal 3000 may be a device wearable to a user. The wearable device may include at least one of an accessory-type device (e.g., a watch, a ring, a bracelet, an anklet, a necklace, glasses, or contact lenses), a head-mounted-device (HMD), a fabric or clothing-integral device (e.g., electronic clothing), a body-mounted-device (e.g., a skin pad), or a biometric transplant device (e.g., an implantable circuit). Hereinafter, for convenience of explanation, an example in which the mobile terminal 3000 is a smartphone will be described.

Figure 2:
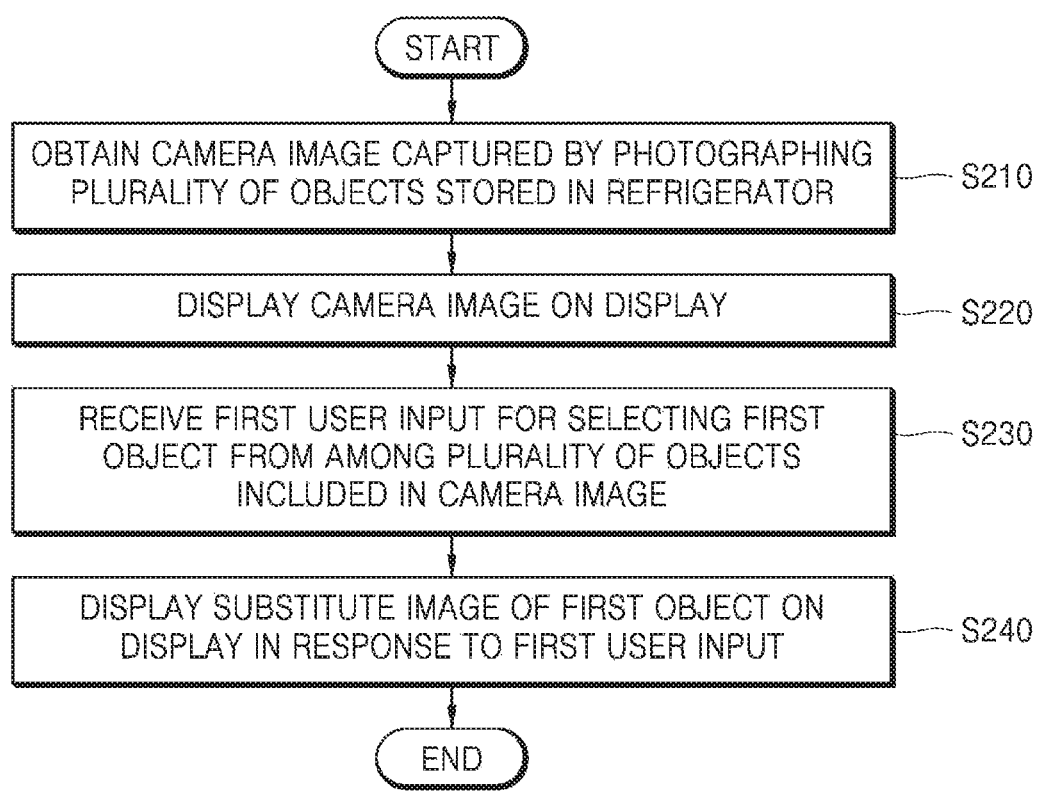
FIG. 2 is a flowchart of a method of providing information about an object in a refrigerator according to an embodiment.

FIG. 2 is a flowchart of a method of providing information about an object in a refrigerator, according to an embodiment.

In operation S210, the refrigerator 1000 according to an embodiment may obtain a camera image captured by photographing a plurality of objects stored in the refrigerator 1000 through a camera arranged in the refrigerator 1000.

According to an embodiment, the camera image may be an RGB image. According to an embodiment, the camera image may be a monochrome image, but embodiments are not limited thereto. According to an embodiment, the camera image may be a two-dimensional image or a three-dimensional image.

According to an embodiment, a plurality of cameras may be arranged in the refrigerator 1000. For example, depending on the size of the refrigerator 1000, a camera may be installed on each of shelves. When a plurality of cameras are arranged, the refrigerator 1000 may obtain a plurality of camera images. For example, the refrigerator 1000 may obtain a first camera image including first objects kept on a first shelf by using a first camera, obtain a second camera image including second objects kept on a second shelf by using a second camera, and obtain a third camera image including third objects kept on a third shelf by using a third camera.

The camera image may be an image generated by combining the plurality of camera images. For example, the camera image may be a panorama image in which the first camera image, the second camera image, and the third camera image are combined.

According to an embodiment, the refrigerator 1000 may obtain the camera image by using the camera after a predetermined time period after a user opens or closes a door of the refrigerator 1000 (for example, three (3) seconds after the door is closed). In this case, because the objects stored in the refrigerator 1000 may be changed according to the user's opening and closing of the door of the refrigerator 1000, a real time image of the changed objects may be obtained.

According to an embodiment, the refrigerator 1000 may obtain the camera image by using the camera at a predetermined time interval. For example, the refrigerator 1000 may obtain the camera image by using the camera at a time interval of three hours.

According to an embodiment, when the plurality of cameras are arranged in the refrigerator 1000, the cameras may have different image detection time points. For example, the first camera may obtain the first camera image about the first shelf after a predetermined time period is passed after the door is opened and closed and the second camera may obtain the second camera image about the second shelf at a predetermined time interval.

In operation S220, the refrigerator 1000 according to an embodiment may display the camera image on a display unit.

According to an embodiment, the refrigerator 1000 may display the camera image on the display unit of the refrigerator 1000. For example, when a new camera image is obtained, the refrigerator 1000 may display a newly obtained camera image in real time on the display unit of the refrigerator 1000. In addition, when the refrigerator 1000 receives a user input for requesting a camera image of the inside of the refrigerator 1000, the refrigerator 1000 may display the most recently captured camera image on the display unit of the refrigerator 1000.

According to an embodiment, the refrigerator 1000 may display the camera image through the mobile terminal 3000 connected to the refrigerator 1000. For example, when a user executes a refrigerator management application in the mobile terminal 3000, the mobile terminal 3000 may display the camera image on an execution window of the refrigerator management application. An operation of displaying the camera image on the mobile terminal 3000 will be described below in detail with reference to FIG. 21.

In operation S230, the refrigerator 1000 according to an embodiment may receive a first user input for selecting a first object from among a plurality of objects included in the camera image.

According to an embodiment, the first user input may be a touch input generated by touching the first object on the camera image, but embodiments are not limited thereto.

According to an embodiment, the first object may be an object that is difficult for the user to clearly identify on the camera image, but embodiments are not limited thereto. For example, the first object may be an object partially obscured by another object. In addition, the first object may be a fallen object, or may be an object positioned behind a shelf and displayed small on a camera image.

According to an embodiment, the refrigerator 1000 may identify at least one object based on the result of analyzing the camera image. For example, a processor of the refrigerator 1000 may compare an image of each of the objects included in the camera image with a registered object list including images of pre-registered objects to identify each of the objects included in the camera image.

According to an embodiment, the registered object list may be a list of objects stored in the refrigerator 1000. When a new object is added to the refrigerator 1000 or a certain object is removed from the refrigerator 1000, the registered object list may be updated. In this specification, registration of an object may mean that the object begins to be stored in the refrigerator 1000 and information about the object is added to the registered object list.

For example, referring to FIG. 3, a registered object list 300 may include information such as an object image 301, an item name 302, an expiration date 303, and the like, but embodiments are not limited thereto. The object image 301 may be an image of an object photographed by a camera arranged in the refrigerator 1000 when the object is stored in the refrigerator 1000. In addition, the object image 301 may be an image retrieved from a web server or an image stored by a user, but embodiments are not limited thereto. The item name 302 and the expiration date 303 of the object may be registered by performing an optical character recognition (OCR) operation on the object image 301, or may be received from a user and registered. OCR is a technique for converting Korean, English, and numeric fonts included in image documents into editable text.

According to an embodiment, the processor of the refrigerator 1000 may detect the type of the object, the name of the object, the position of the object, etc. by comparing the camera image with the images of objects included in the registered object list 300. For example, when a user touches the first position on the camera image where a milk bottle is displayed, the refrigerator 1000 may compare the image of the milk bottle present in the first position with the object images of the registered object list 300 to thereby detect that the user has selected the milk bottle among a plurality of objects.

According to an embodiment, the refrigerator 1000 may apply a camera image to an AI model for object identification to identify at least one object included in the camera image.

In operation S240, the refrigerator 1000 according to an embodiment may display a substitute image of the first object on the display unit in response to the first user input.

According to an embodiment, the substitute image of the first object may be a whole image through which the first object may be clearly recognized. According to an embodiment, the substitute image of the first object may be a two-dimensional image or a three-dimensional image.

According to an embodiment, the substitute image of the first object may include an image (e.g., a front image) of a representative surface of a product corresponding to the first object. In this case, the refrigerator 1000 may retrieve the image of the representative surface of the product corresponding to the first object, in response to the first user input for selecting the first object. For example, the refrigerator 1000 may retrieve the image of the representative surface in the registered object list 300, or may retrieve the image of the representative surface in an external web server or the server apparatus 2000. The refrigerator 1000 may display the retrieved image of the representative surface on the display unit. In this case, the image of the representative surface may be an object image 301 registered in the registered object list 300 or an image retrieved by using a product name as a keyword in the web server, but embodiments are not limited thereto.

According to an embodiment, the refrigerator 1000 may superimpose and display a substitute image of the first object on the first object of the camera image. For example, the refrigerator 1000 may superimpose and display a substitute image of the first object on the first object by using an AR technique.

According to an embodiment, the refrigerator 1000 may display a substitute image of the first object on a second area different from a first area in which the camera image is displayed. Hereinafter, with reference to FIGS. 4A, 4B, 4C and 5, an operation, in which the refrigerator 1000 displays a substitute image of the first object on the display unit, will be described in more detail.

FIGS. 4A, 4B, 4C and 5 are views for explaining an operation in which the refrigerator 1000 displays a substitute image of an object on a display unit, according to an embodiment.

Figure 4A:
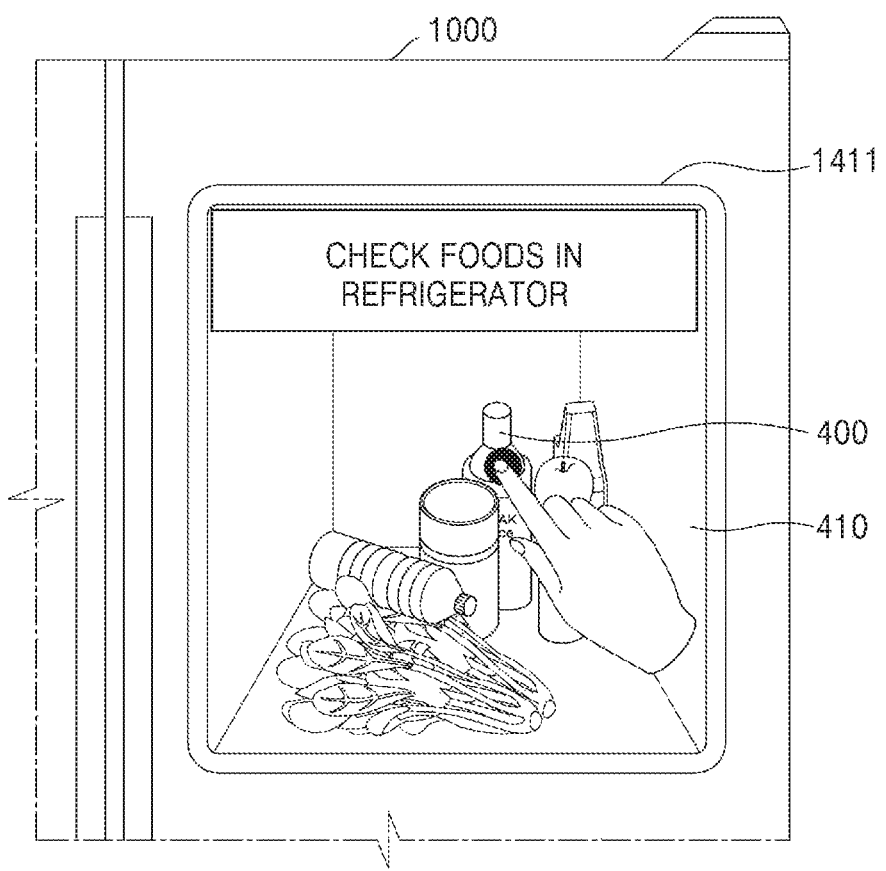

Referring to FIG. 4A, the refrigerator 1000 may display, on a display 1411, a camera image 410 captured by photographing objects in the refrigerator 1000 by using a camera. A user may identify the objects in the refrigerator 1000 through the camera image 410 even when the door of the refrigerator 1000 is not opened. However, when a first object 400 is obscured by a can and a beverage can and thus is not accurately identified, the user may touch the first object 400 within the camera image 410. In this case, the refrigerator 1000 may sense a user input of touching the first object.

Referring to FIG. 4B, the refrigerator 1000 may obtain a substitute image 411 of the first object 400 in response to the user input of touching the first object 400. For example, the substitute image 411 of the first object 400 may be an image 401 stored at the time of registration, an image 402 retrieved from a web server, and an image 403 received from the server apparatus 2000. The refrigerator 1000 may display the substitute image 411 of the first object 400 on the first object 400 by using the AR technique. In this case, the user may clearly recognize that the first object 400 is a steak sauce bottle, through the substitute image 411 of the first object 400. According to an embodiment of the disclosure, when the substitute image 411 of the first object 400 is displayed and a certain time (for example, one minute) elapses, the refrigerator 1000 may delete the substitute image 411 of the first object 400 from the camera image 410.

Figure 4C:
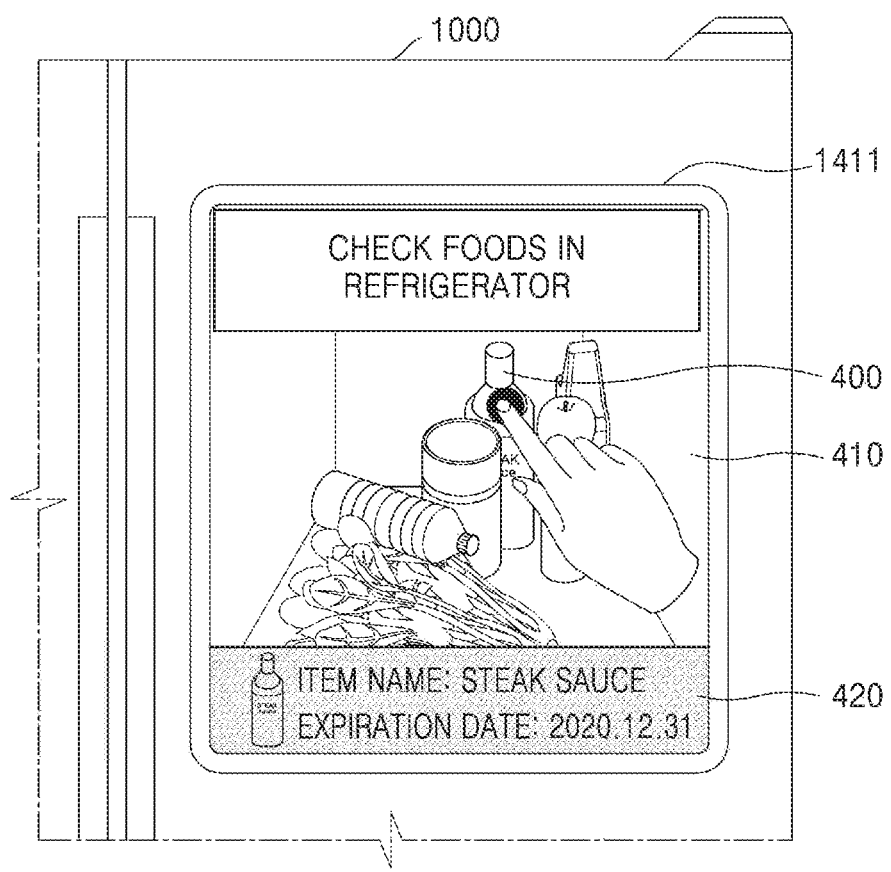

Referring to FIG. 4C, in response to a user input of touching the first object 400, the refrigerator 1000 may display the substitute image 411 of the first object 400 on a second area 420 that is different from a first area where the camera image 410 is displayed. In this case, the refrigerator 1000 may further display the item name (steak sauce) of the first object 400 and the expiration date (2020 Dec. 31) of the first object 400 on the second area 420 based on the registered object list 300.

Referring to a screen 500-1 of FIG. 5, a user may touch a second object 500 which has fallen and thus is not visible in the camera image 410. In this case, the refrigerator 1000 may sense a user input of touching the second object 500.

Referring to a screen 500-2 of FIG. 5, the refrigerator 1000 may retrieve a substitute image 510 of the second object 500 in response to the user input of touching the second object 500. For example, the refrigerator 1000 may retrieve an object image (e.g., an image of a representative surface) corresponding to the second object 500 from the registered object list 300. The substitute image 510 of the second object 500 may be an image of the second object 500 standing upright.

According to an embodiment, the refrigerator 1000 may display the substitute image 510 of the second object 500 on the second object 500 in the camera image 410. In this case, the user may confirm that the second object 500, which has fallen in the refrigerator 1000 and thus was not identified, is mineral water.

Figure 6:
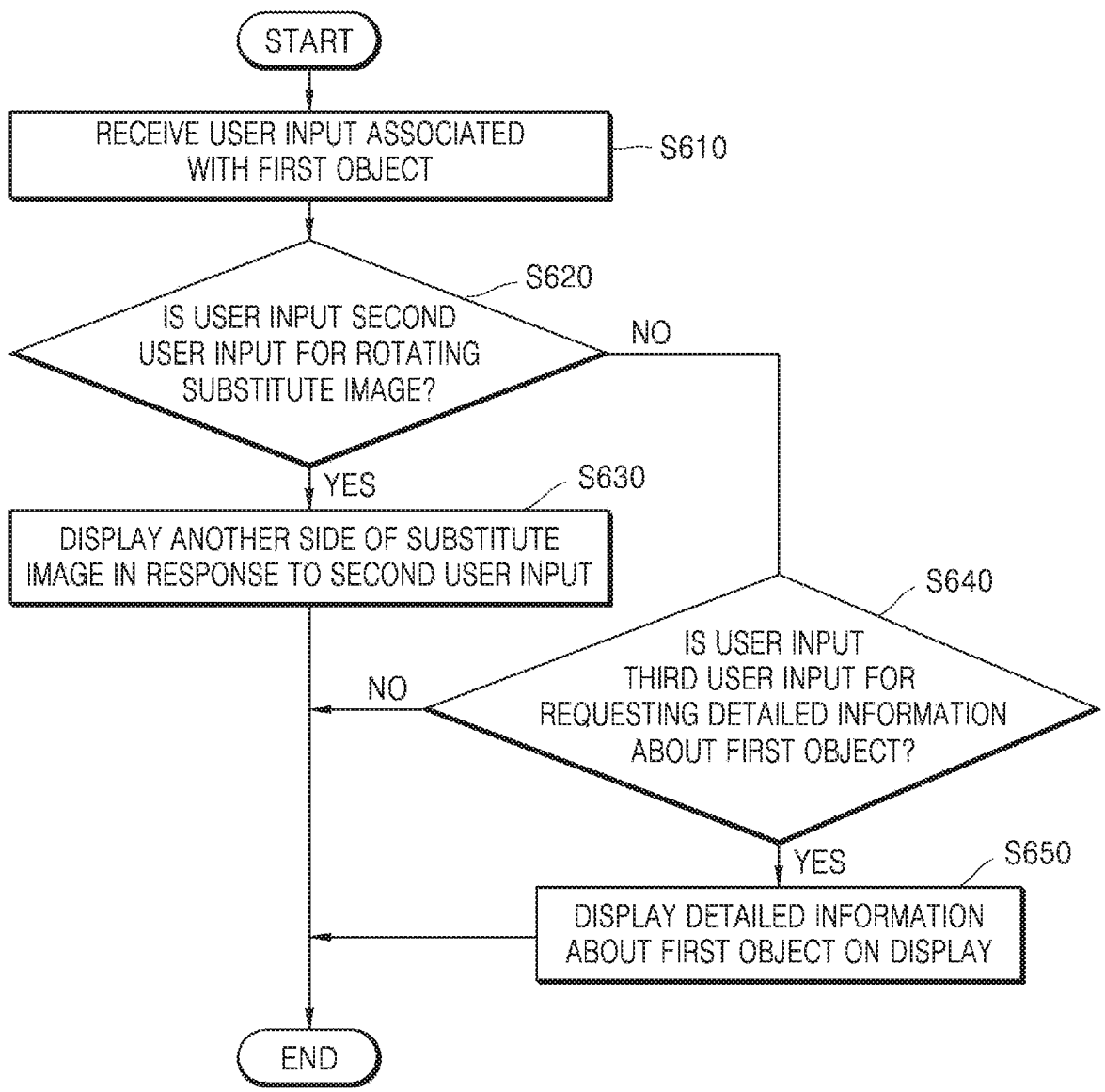
FIG. 6 is a flowchart of a method of providing various types of information about an object in a refrigerator according to an embodiment.

FIG. 6 is a flowchart of a method of providing various types of information about an object in a refrigerator, according to an embodiment.

In operation S610, the refrigerator 1000 according to an embodiment may receive a user input associated with a first object of a plurality of objects included in the camera image. The user input associated with the first object may be a voice input or a touch input, but embodiments are not limited thereto.

For example, the user input associated with the first object may include a second user input for rotating the substitute image of the first object and a third user input for requesting detailed information about the first object.

In operation S620, the refrigerator 1000 according to an embodiment may determine whether the user input associated with the first object is a second user input for rotating the substitute image of the first object. For example, the second user input may be an input that draws a circle while touching the substitute image of the first object or an area adjacent to the substitute image of the first object, or a voice input (e.g., "show another side") to rotate the substitute image of the first object, but embodiments are not limited thereto.

In operation S630, the refrigerator 1000 according to an embodiment may display another side of the substitute image in response to the second user input.

For example, when a displayed substitute image is a front image of a product corresponding to the first object, the refrigerator 1000 may display a side image of the product or a back side image of the product in response to the second user input.

According to an embodiment, when an input that draws a circle while touching an area adjacent to the substitute image of the first object is received, the refrigerator 1000 may display another side of the first object in the substitute image according to an angle between a horizontal line (hereinafter, referred to as a first line) including a touch start point and a line (hereinafter, referred to as a second line) connecting the touch start point to a touch end point. For example, when the angle between the first line and the second line is less than 30 degrees, the refrigerator 1000 may display a right side image of the product corresponding to the first object, and when the angle between the first line and the second line is equal to or greater than 30 degrees and less than 90 degrees, the refrigerator 1000 may display a back side image of the product corresponding to the first object. When the angle between the first line and the second line is equal to or greater than 90 degrees, the refrigerator 1000 may display a left side image of the product corresponding to the first object.

In operation S640, the refrigerator 1000 according to an embodiment may determine whether the user input associated with the first object is a third user input for requesting detailed information about the first object.

For example, the third user input may be a pinch input of moving two fingers in different directions while touching with two fingers the substitute image of the first object, or a double tap input with respect to the substitute image of the first object, but embodiments are not limited thereto. The third user input may be an input of touching a portion, which includes product information, of the substitute image of the first object, or a voice input for requesting the detailed information about the first object.

In operation S650, the refrigerator 1000 according to an embodiment may display the detailed information about the first object on the display unit in response to the third user input.

According to an embodiment, the detailed information about the first object may include, for example, at least one of a storage method of the first object, the manufacturer information of the first object, the composition information of the first object, the expiration date of the first object, the capacity of the first object, the origin of the first object, the date of manufacture of the first object, the food type of the first object, or the use and usage of the first object, but embodiments are not limited thereto.

According to an embodiment, the refrigerator 1000 may superimpose and display the detailed information about the first object on the camera image. According to another embodiment, the refrigerator 1000 may display the detailed information about the first object on a second area different from a first area on which the camera image is displayed.

Figure 7:
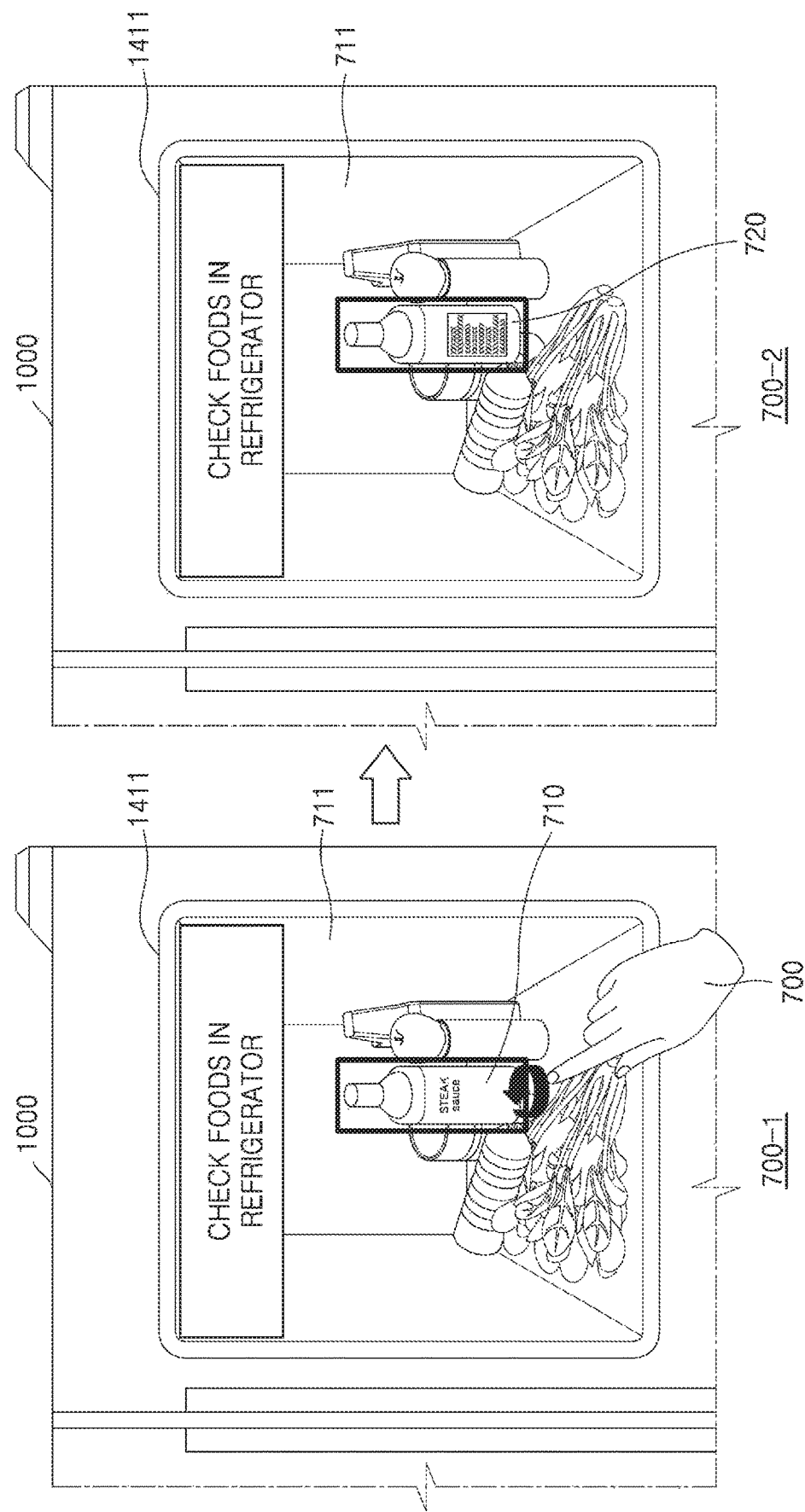
FIG. 7 is a view for explaining an operation in which a refrigerator displays another side of an object in a substitute image according to an embodiment.
Figure 8:
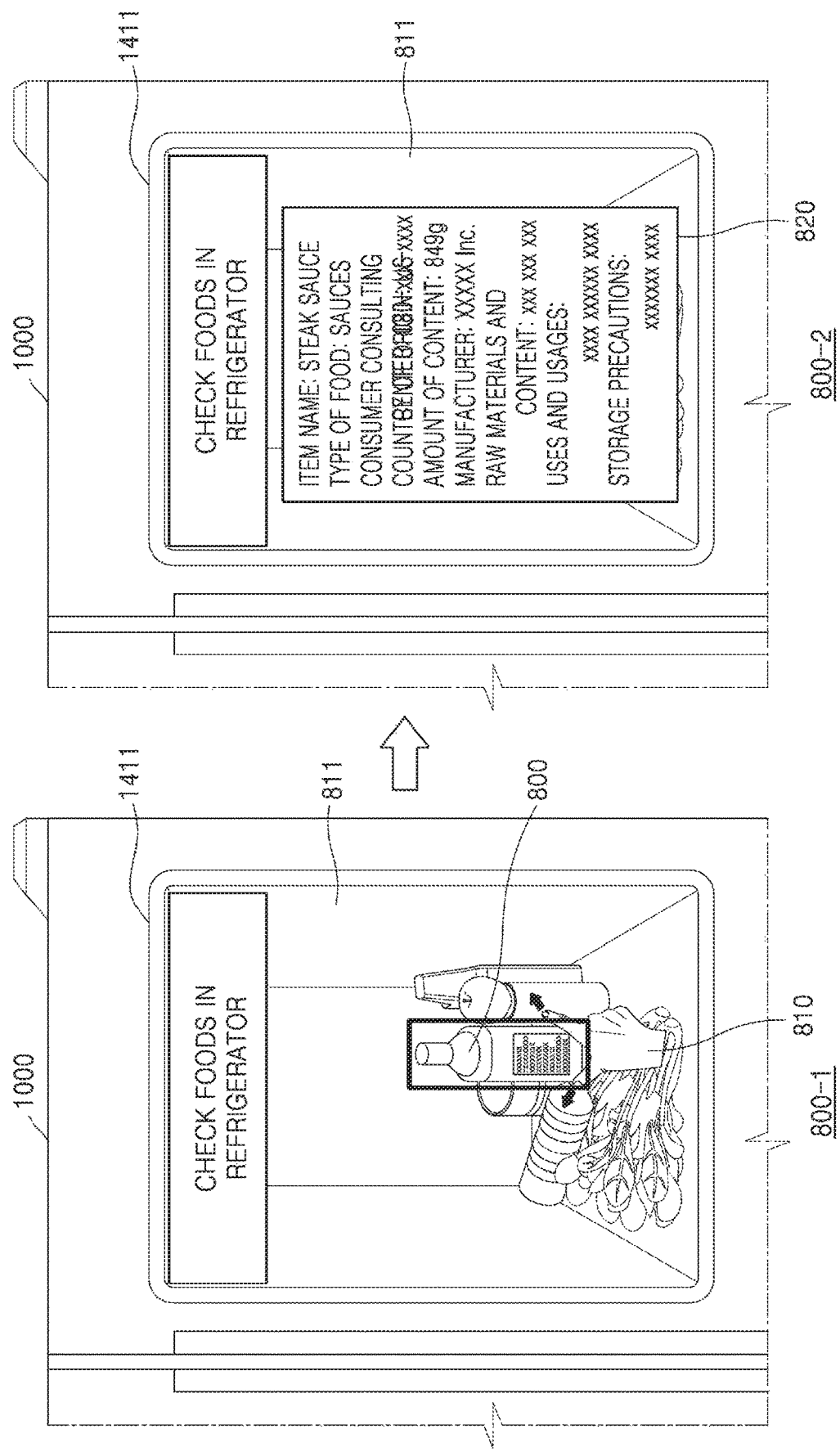
FIGS. 8 and 9 are views for explaining an operation in which a refrigerator provides detailed information about an object according to an embodiment.
Figure 9:
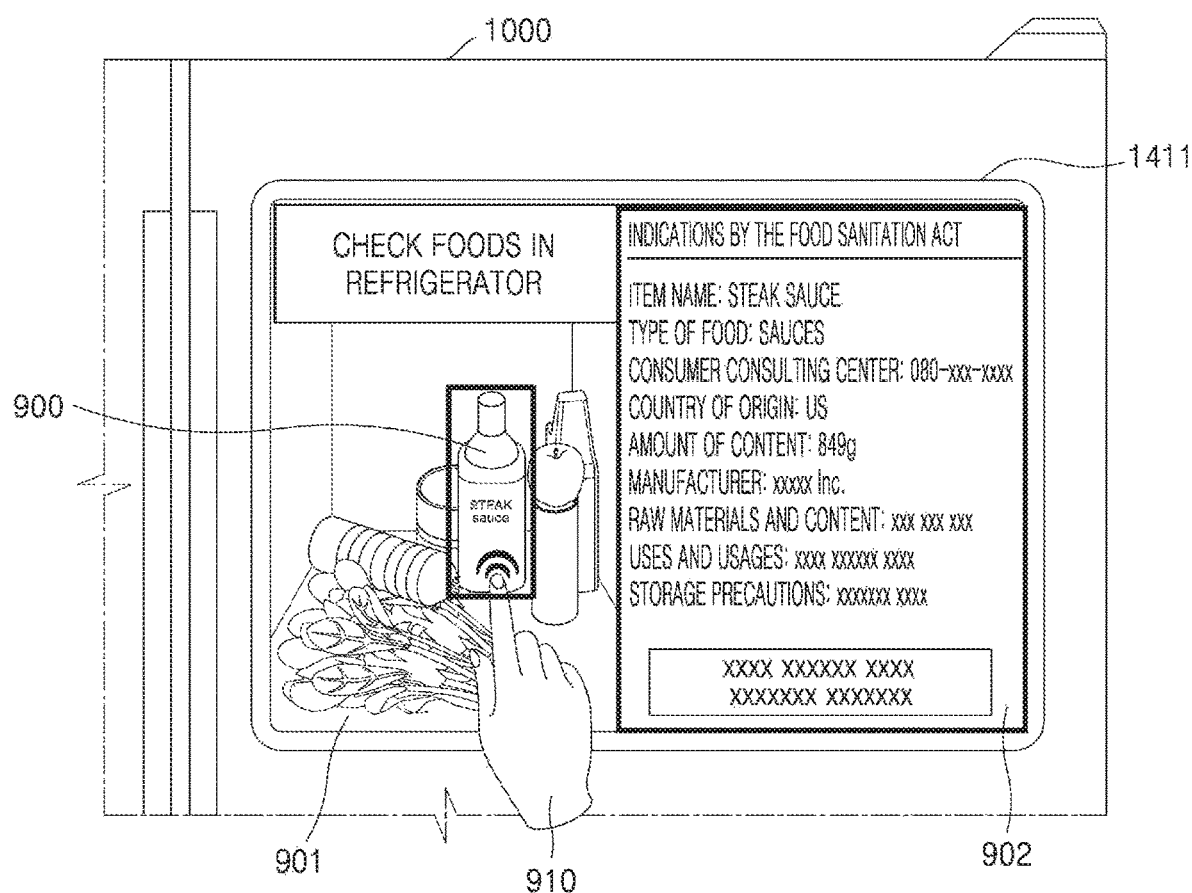

Referring to FIGS. 7 to 9, an operation in which the refrigerator 1000 provides various types of information about an object will be described in further detail.

FIG. 7 is a view for explaining an operation in which a refrigerator 1000 displays another side of a substitute image, according to an embodiment. A case where a first object is a steak sauce bottle will be described as an example, with reference to FIG. 7.

Referring to a screen 700-1 of FIG. 7, the refrigerator 1000 may receive a second user input 700 for rotating a substitute image of the first object (i.e., the steak source bottle) displayed on a camera image 711. In this case, the substitute image of the first object may be a front image 710 of the steak source bottle. For example, the refrigerator 1000 may receive a second user input 700 that draws a circle while touching an area adjacent to the substitute image of the first object.

Referring to a screen 700-2 of FIG. 7, the refrigerator 1000 may change the substitute image of the first object from the front image 710 of the steak source bottle to a rear image 720 of the steak source bottle in response to the second user input 700 and display the rear image 720.

According to an embodiment, a user may easily check another side of the first object through a rotation input (a touch input) with respect to the substitute image of the first object.

FIGS. 8 and 9 are views for explaining an operation in which a refrigerator 1000 provides detailed information about an object, according to an embodiment. A case where a first object is a steak sauce bottle will be described as an example, with reference to FIGS. 8 and 9.

Referring to a screen 800-1 of FIG. 8, the refrigerator 1000 may receive a pinch input 810 with respect to a substitute image 800 of the first object displayed on a camera image 811. For example, the refrigerator 1000 may receive an input of moving two fingers in different directions while touching with two fingers the substitute image 800 of the first object.

Referring to a screen 800-2 of FIG. 8, the refrigerator 1000 may display detailed information 820 (e.g., a product description) about the first object on the camera image 811 in response to the pinch input 810 with respect to a substitute image 800 of the first object. For example, the refrigerator 1000 may display the item name of the first object (steak sauce), the type of food (sauce), a consumer consulting center, the country of origin (US), the amount of content (849 g), a manufacturer, raw materials and content, uses and usages, and storage precautions, etc.

According to an embodiment, the refrigerator 1000 may obtain the detailed information 820 about the first object from registered object database stored in an internal memory of the refrigerator 1000, or may receive the detailed information 820 about the first object from the server apparatus 2000, but embodiments are not limited thereto.

Referring to FIG. 9, the refrigerator 1000 may sense a double tap input 910 with respect to a substitute image 900 of the first object displayed in a camera image 901. In this case, the refrigerator 1000 may display detailed information 902 (e.g., a product description) about the first object on a second area different from a first area on which the camera image 901 is displayed.

In this case, even when a user does not read a product description written on the surface of the first object by opening the door of the refrigerator 1000 and taking out the first object, detailed information about a product may be easily checked only by the double tap input 910 on the substitute image 900 of the first object.

Figure 10:
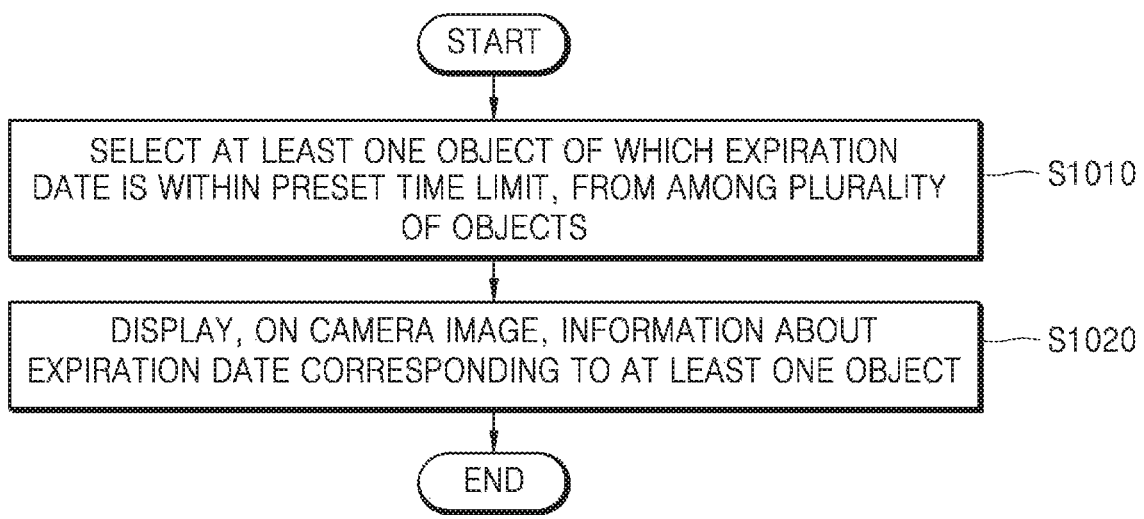
FIG. 10 is a flowchart of a method of providing information about the expiration date of an object according to an embodiment.

FIG. 10 is a flowchart of a method of providing information about the expiration date of an object, according to an embodiment.

In operation S1010, the refrigerator 1000 according to an embodiment may select at least one object of which an expiration date is within a preset time limit, from among a plurality of objects.

For example, when the preset time limit is one week, the refrigerator 1000 may select at least one object of which an expiration date is less than one week from the current date. For example, when the expiration date of a first object is one away from the current date, the expiration date of a second object is two months away from the current date, and the expiration date of a third object is five days away from the current date, the refrigerator 1000 may select the third object from among the plurality of objects.

According to an embodiment, the preset time limit may be changed by a user's input. For example, when a user wishes to be notified when an expiration date of an object is two weeks or less from the current date, the user may change the preset time limit to two weeks.

According to an embodiment, the preset time limit may be differently applied depending on the length of an initial expiration period of the object or the number of times the object is used. For example, when the initial expiration period of the object is greater than one year, the preset time limit that may be applied is one month, and when the initial expiration period of the object is less than one month, the preset time limit that may be applied is one week. In addition, when the initial expiration period of the object is equal to or greater than one month and less than one year, the preset time limit that may be applied is two weeks.

In addition, when the user frequently uses the object, the preset time limit may be set to be short, and when the user does not frequently use the object, the preset time limit may be set to be long. For example, when the user uses a first object once a day, a preset time limit for the first object may be 3 days, and when the user uses a second object once a month, a preset time limit for the second object may be one month.

In operation S1020, the refrigerator 1000 according to an embodiment may display, on a camera image, information about an expiration date corresponding to the at least one object.

According to an embodiment, the refrigerator 1000 may display the information about the expiration date on the camera image with respect to a corresponding object. For example, the refrigerator 1000 may display the expiration date on the corresponding object, or may display the expiration date on an area adjacent to the corresponding object. Also, the refrigerator 1000 may connect, by a line, information about the expiration date to the corresponding object.

Figure 11:
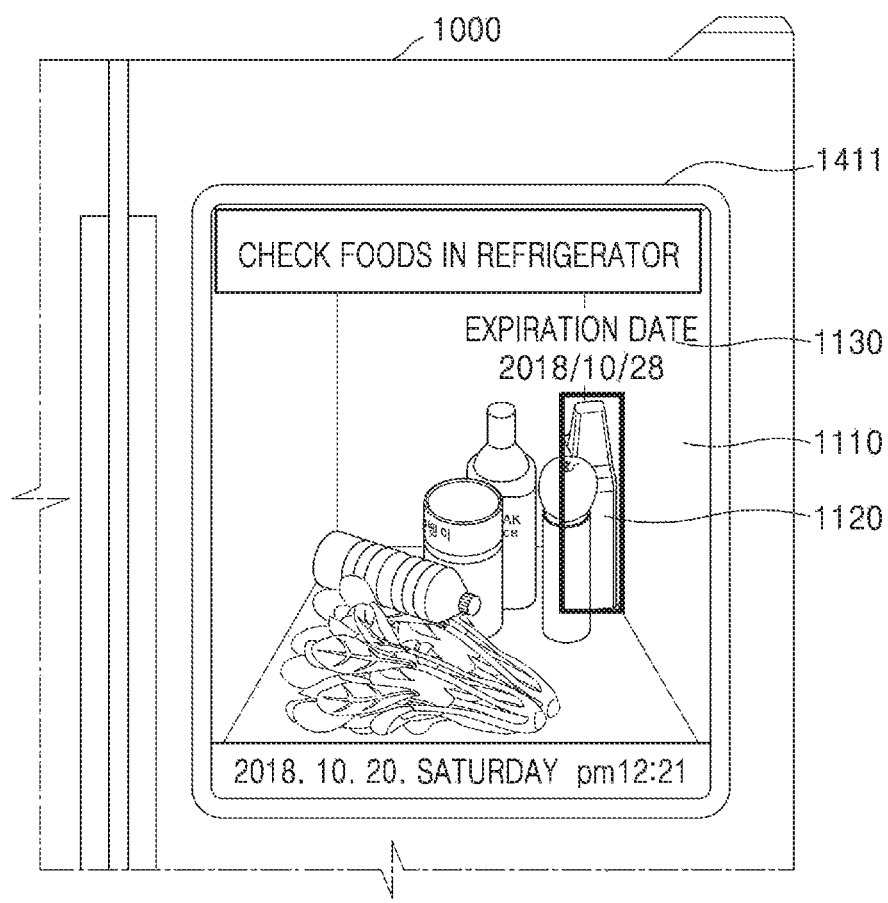
FIG. 11 is a view for explaining an operation in which a refrigerator provides information about the expiration date of an object according to an embodiment.

FIG. 11 is a view for explaining an operation in which a refrigerator 1000 provides information about the expiration date of an object, according to an embodiment.

Referring to FIG. 11, the refrigerator 1000 may obtain a camera image 1110 captured by photographing the inside of the refrigerator 1000 through a camera arranged in the refrigerator 1000. The refrigerator 1000 may analyze the camera image 1110 to identify a plurality of objects included in the camera image 1110.

When the current date is 2018 Oct. 20 and the preset time limit is 10 days, the refrigerator 1000 may select a third object 1120 of which an expiration period expires within 10 days from the current date from among the identified plurality of objects. The refrigerator 1000 may display information 1130 (e.g., expiration date 2018 Oct. 28) about the expiration date of the third object 1120 on the camera image 1110.

According to an embodiment, a user may easily identify objects of which an expiration period is short, and may promote use of the identified objects within the expiration period.

Figure 12:
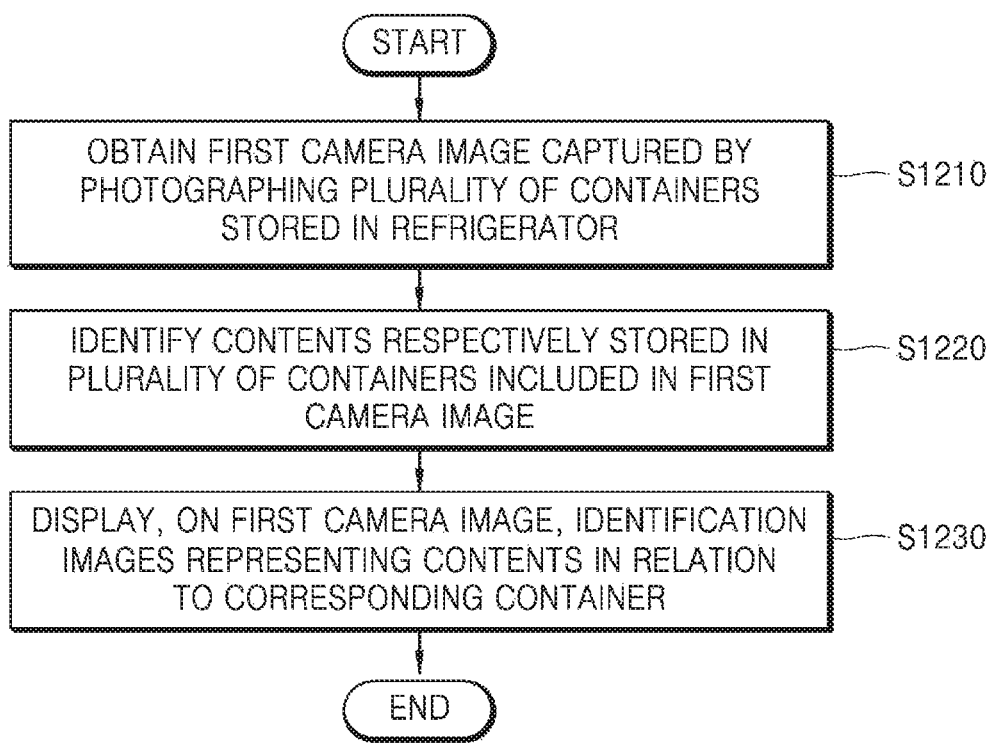
FIG. 12 is a flowchart of a method of providing information about a container in a refrigerator according to an embodiment.

FIG. 12 is a flowchart of a method of providing information about a container in a refrigerator, according to an embodiment.

In operation S1210, the refrigerator 1000 according to an embodiment may obtain a first camera image captured by photographing a plurality of containers stored in the refrigerator 1000 through a camera arranged in the refrigerator 1000.

Here, the container may refer to a sealed container for storing food ingredients. The container may be a plastic container, a glass container, or the like. In addition, the container may be a transparent container, a translucent container, or an opaque container.

According to an embodiment, the camera image may be an RGB image. According to an embodiment, the camera image may be a monochrome image, but embodiments are not limited thereto. According to an embodiment, the camera image may be a two-dimensional image or a three-dimensional image.

According to an embodiment, a plurality of cameras may be arranged in the refrigerator 1000. For example, depending on the size of the refrigerator 1000, a camera may be installed on each of shelves. When a plurality of cameras are arranged, the refrigerator 1000 may obtain a plurality of camera images. For example, the refrigerator 1000 may obtain a first camera image including first containers kept on a first shelf by using a first camera, obtain a second camera image including second containers kept on a second shelf by using a second camera, and obtain a third camera image including third containers kept on a third shelf by using a third camera.

The camera image may be an image generated by combining the plurality of camera images. For example, the camera image may be a panorama image in which the first camera image, the second camera image, and the third camera image are combined.

According to an embodiment, the refrigerator 1000 may obtain the camera image by using the camera after a predetermined time period after a user opens or closes a door of the refrigerator 1000 (for example, three (3) seconds after the door is closed). In this case, because the containers stored in the refrigerator 1000 may be changed according to the user's opening and closing of the door of the refrigerator 1000, a real time image of the changed containers may be obtained.

According to an embodiment, the refrigerator 1000 may obtain the camera image by using the camera at a predetermined time interval. For example, the refrigerator 1000 may obtain the camera image by using the camera at a time interval of three hours.

According to an embodiment, when the plurality of cameras are arranged in the refrigerator 1000, the cameras may have different image detection time points. For example, the first camera may obtain the first camera image about the first shelf after a predetermined time period is passed after the door is opened and closed and the second camera may obtain the second camera image about the second shelf at a predetermined time interval.

In operation S1220, the refrigerator 1000 according to an embodiment may identify contents respectively stored in the plurality of containers included in the first camera image.

According to an embodiment, the refrigerator 1000 may analyze the first camera image and extract the plurality of containers included in the first camera image. The refrigerator 1000 may compare each of the extracted plurality of containers with registered containers included in a registered container list.

The refrigerator 1000 may obtain information about the contents respectively stored in the plurality of containers from the registered container list, based on a result of comparing each of the plurality of containers with the registered containers. According to an embodiment, the registered container list may include an image of a registered container, information (e.g., an identification image) about a content stored in the registered container, a registration date, and the like. The image of the registered container may be an image of a container photographed by a camera arranged in the refrigerator 1000 when the container is stored in the refrigerator 1000. The information about the content stored in the registered container may be received from a user at the time of registration. The registration date may refer to a date when the container starts to be stored in the refrigerator 1000.

Therefore, the refrigerator 1000 may compare the image of a container extracted from a first camera image with the images of the registered containers included in the registered container list, identify the extracted container, and obtain, from the registered container list, information about a content stored in the extracted container.

In operation S1230, the refrigerator 1000 according to an embodiment may display, on the first camera image, identification images representing contents in relation to a corresponding container.

According to an embodiment, an identification image representing the content of a container may be, but is not limited to, an icon indicating a main material of the content, an icon representing the content, or the like. For example, when the content of a first container is pumpkin soup, a first identification image representing the content of the first container may be a pumpkin icon, and when the content of a second container is fried rice, a second identification image representing the content of the second container may be an icon that simplifies the fried rice. When the content of a third container is cucumber kimchi, a third image representing the content of the third container may be a cucumber icon. According to an embodiment, an identification image representing the content of a container may be text. For example, when the content of the first container is pumpkin soup, the first identification image representing the content of the first container may be an icon including a text 'pumpkin soup'.

According to an embodiment, the refrigerator 1000 may display an identification image representing the content of a corresponding container within a predetermined distance from the corresponding container. For example, the refrigerator 1000 may display the first identification image representing the content of the first container on the first container, or may display the first identification image on an area adjacent to the first container.

According to another embodiment, the refrigerator 1000 may connect via a line an identification image representing the content of a corresponding container to the corresponding container and display the identification image on the first camera image. For example, the refrigerator 1000 may connect, via a line, the first identification image representing the content of the first container to the first container and display the first identification image.

According to an embodiment, when a user may not accurately determine what the content in a container is, through a camera image, an identification image representing the content in the container may be displayed on the camera image, so that the user may determine at a glance what content is contained in the container, even when the user does not open the door of the refrigerator 1000 and does not take out the container.

According to an embodiment, the refrigerator 1000 may obtain a second camera image captured by photographing a plurality of containers stored in the refrigerator 1000 after obtaining the first camera image. For example, the refrigerator 1000 may photograph the inside of the refrigerator 1000 at 1 p.m. to obtain the first camera image and then photograph the inside of the refrigerator 1000 again at 2 p.m. to obtain the second camera image.

According to an embodiment, the refrigerator 1000 may track a movement position of each of the plurality of containers in the refrigerator 1000 by using the second camera image. The refrigerator 1000 may display identification images respectively representing the contents of the containers, in relation to the movement position of a corresponding container, based on a result of the tracking.

For example, it is assumed that a user opens the door of the refrigerator 1000 at 1 p.m. and places a first container on a second shelf and then the user opens the door of the refrigerator 1000 again at 2 p.m. and moves the first container from the second shelf to a third shelf. In this case, the refrigerator 1000 may analyze the first camera image at 1 p.m. to confirm that the first container is located on the second shelf, and may display a first identification image, which represents the content of the first container, on the first container located on the second shelf in the first camera image. Then, the refrigerator 1000 may analyze the second camera image at 2 p.m. to confirm that the first container is located on the third shelf rather than the second shelf. The refrigerator 1000 may display the first identification image representing the content of the first container on the first container of the third shelf in the second camera image. Therefore, according to an embodiment, even when the position of a container is changed in the refrigerator 1000, the refrigerator 1000 may track the changed position and display an identification image with respect to the changed position.

Hereinafter, an operation in which the refrigerator 1000 displays an identification image representing the content of a container will be described in more detail with reference to FIG. 13.

Figure 13:
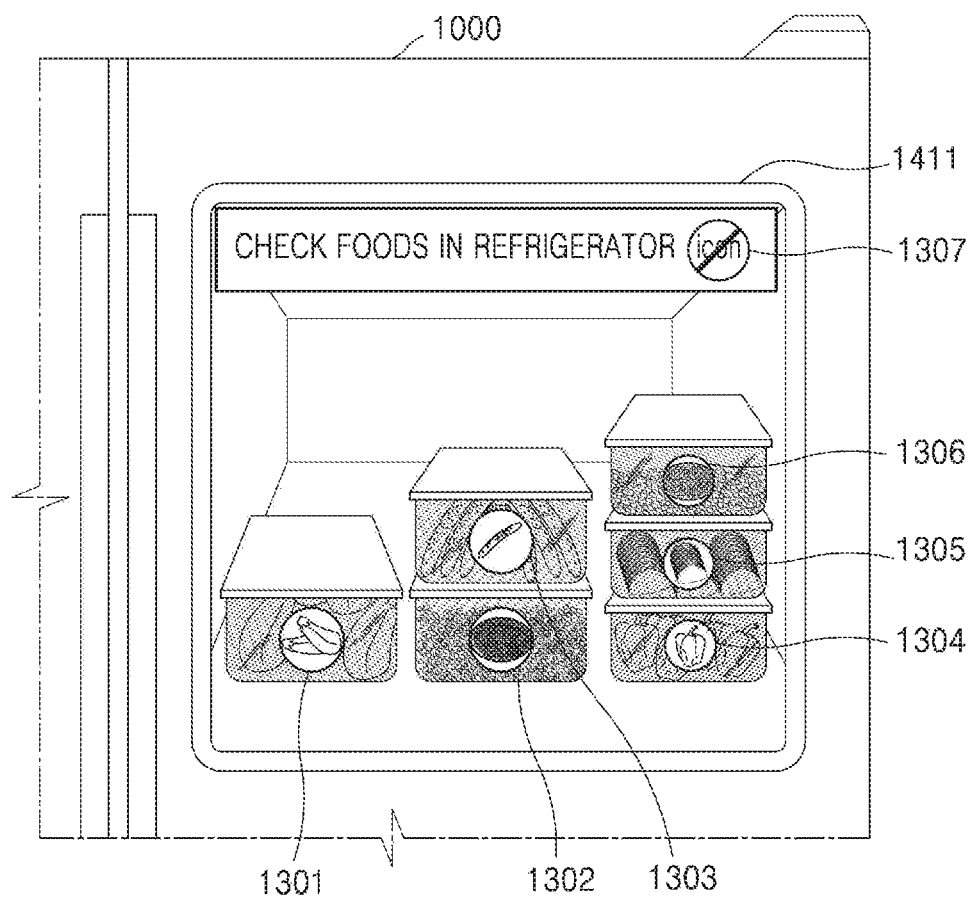
FIG. 13 is a view for explaining an operation in which a refrigerator displays identification images respectively representing contents, in relation to a corresponding container, according to an embodiment.

FIG. 13 is a view for explaining an operation in which a refrigerator displays identification images respectively representing contents in a corresponding container, according to an embodiment.

Referring to FIG. 13, the refrigerator 1000 may identify containers included in a camera image. The refrigerator 1000 may display identification images respectively representing the contents of the identified containers on the camera image. For example, the refrigerator 1000 may display an eggplant icon 1301 representing the content (e.g., eggplant) of a first container on the first container, display a fried rice icon 1302 representing the content (e.g., fried rice) of a second container on the second container, display a cucumber icon 1303 representing the content (e.g., cucumber kimchi) of a third container on the third container, display a paprika icon 1304 representing the content (e.g., paprika) of a fourth container on the fourth container, display a pickled radish icon 1305 representing the content (e.g., pickled radishes) of a fifth container on the fifth container, and display a bean icon 1306 representing the content (e.g., bean) of a sixth container on the sixth container.

On the other hand, when a user selects an icon removal button 1307, the refrigerator 1000 may not display the icons 1301 to 1306 on the camera image.

Figure 14:
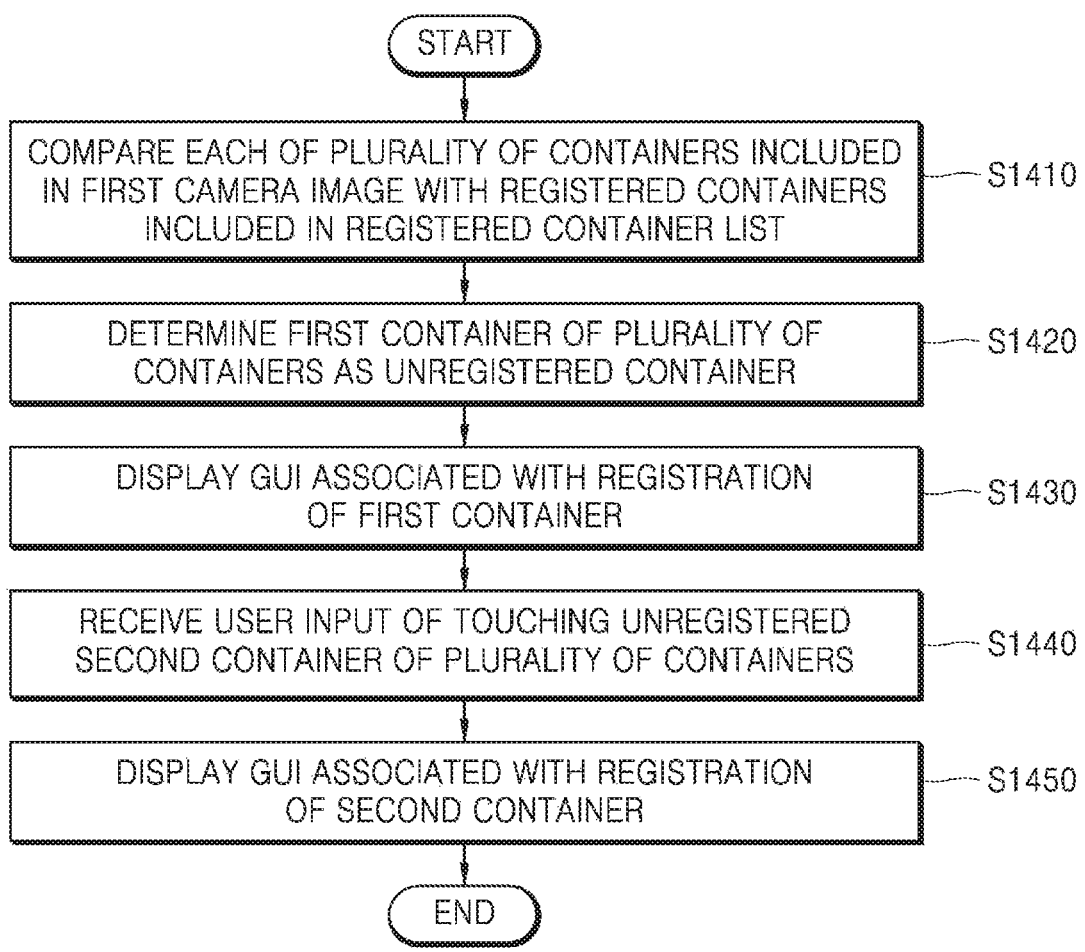
FIG. 14 is a flowchart of a method of providing a graphical user interface (GUI) associated with registration of a container according to an embodiment.

FIG. 14 is a flowchart of a method of providing a GUI associated with registration of a container, according to an embodiment.

In operation S1410, the refrigerator 1000 according to an embodiment may compare each of a plurality of containers included in a first camera image with registered containers included in a registered container list.

For example, the refrigerator 1000 may extract the plurality of containers from the first camera image and compare each of the images of the extracted plurality of containers with the images of the registered containers. The refrigerator 1000 may identify the contents of the plurality of containers, the date of first registration, and the like based on a result of the comparing.

In operation S1420, the refrigerator 1000 according to an embodiment may determine a first container of the plurality of containers as an unregistered container. For example, when the image of the first container is not present in the registered container list, the refrigerator 1000 may determine the first container as an unregistered container.

In operation S1430, the refrigerator 1000 according to an embodiment may display a graphical user interface (GUI) associated with registration of the first container.

According to an embodiment, the GUI associated with the registration of the first container may include a field for inputting an item name of the content of the first container, a field for selecting an identification image of the first container, and the like, but embodiments are not limited thereto.

According to an embodiment, the refrigerator 1000 may receive information about a first content of the first container from a user through the GUI. In this case, the refrigerator 1000 may match the image of the first container to the information about the first content of the first container and store matching information in the registered container list.

When the first container is newly registered, the refrigerator 1000 may add, onto the first camera image, a first identification image representing the first content of the first container, in relation to the first container.

In operation S1440, the refrigerator 1000 according to an embodiment may receive a user input of touching an unregistered second container of a plurality of containers.

For example, when the refrigerator 1000 does not recognize that the unregistered second container is newly added to the refrigerator 1000, a user may touch the second container on the first camera image to register the second container.

In operation S1450, the refrigerator 1000 according to an embodiment may display a GUI associated with registration of the second container.

According to an embodiment, the GUI associated with the registration of the second container may include a field for inputting an item name of the content of the second container, a field for selecting an identification image of the second container, and the like, but embodiments are not limited thereto.

According to an embodiment, the refrigerator 1000 may receive information about a second content of the second container from a user through the GUI. In this case, the refrigerator 1000 may match the image of the second container to the information about the second content of the second container and store matching information in the registered container list.

When the second container is newly registered, the refrigerator 1000 may add, onto the first camera image, a second identification image representing the second content of the second container, in relation to the second container.

Figure 15:
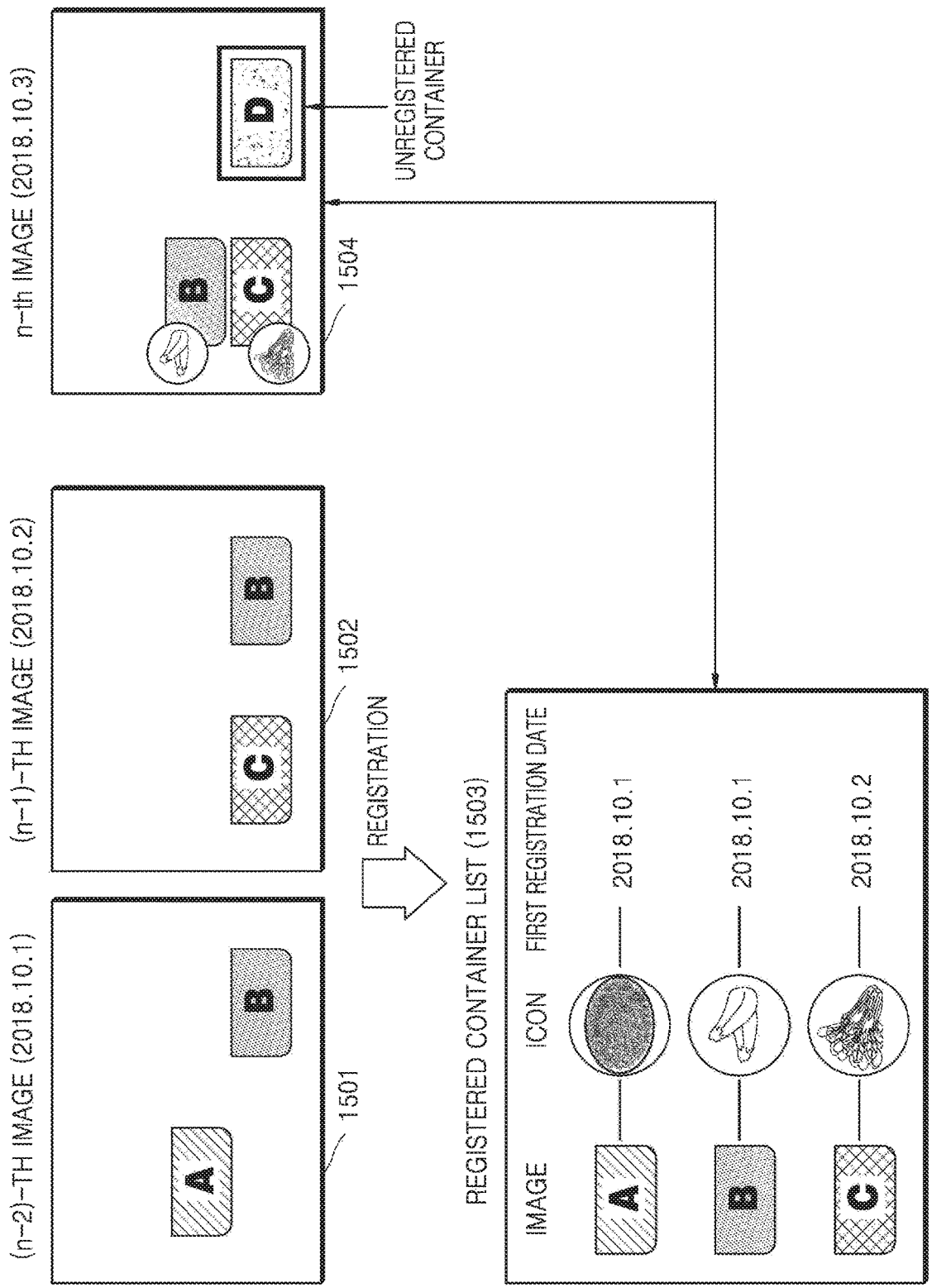
FIG. 15 is a view for explaining an operation in which a refrigerator tracks a movement position of a container according to an embodiment.

FIG. 15 is a view for explaining an operation in which a refrigerator according to an embodiment tracks a movement position of a container.

Referring to FIG. 15, the refrigerator 1000 may obtain an (n−2)-th image 1501 captured by photographing the inside of the refrigerator 1000 on Oct. 1, 2018. The refrigerator 1000 may extract a container A and a container B by analyzing the (n−2)-th image 1501. The containers A and B may be added to a registered container list 1503. In this case, the refrigerator 1000 may match the image of the container A, an icon representing the content of the container A, and the first registration date of 2018 Oct. 1 of the container A to one another and store a result of the matching in the registered container list 1503. Also, the refrigerator 1000 may match the image of the container B, an icon representing the content of the container B, and the first registration date of 2018 Oct. 1 of the container B to one another and store a result of the matching in the registered container list 1503.

The refrigerator 1000 may obtain an (n−1)-th image 1502 captured by photographing the inside of the refrigerator 1000 on Oct. 2, 2018. The refrigerator 1000 may extract a container C and a container D by analyzing the (n−1)-th image 1502. The container C may be added to the registered container list 1503. In this case, the refrigerator 1000 may match the image of the container C, an icon representing the content of the container C, and the first registration date of 2018 Oct. 2 of the container C to one another and store a result of the matching in the registered container list 1503.

Therefore, the registered container list 1503 may store information about the containers A, B, and C.

The refrigerator 1000 may obtain an n-th image 1504 captured by photographing the inside of the refrigerator 1000 on Oct. 3, 2018. The refrigerator 1000 may extract the container B, the container C, and the container D by analyzing the n-th image 1504. The refrigerator 1000 may compare the image of the container B, the image of the container C, and the image of the container D with the images of registered containers stored in the registered container list 1503. Because the image of the container B and the image of the container C are stored in the registered container list 1503, the refrigerator 1000 may obtain an icon (e.g., an eggplant icon) representing the content of the container B and an icon (e.g., a spinach icon) representing the content of the container C from the registered container list 1503. According to an embodiment, when searching for the container B and the container C in the registered container list 1503, the refrigerator 1000 may use metric learning. According to an embodiment, the refrigerator 1000 may display an eggplant icon on the container B in the n-th image 2018 Oct. 3 and display a spinach icon on the container C in the n-th image 2018 Oct. 3.

Because the image of the container D is not stored in the registered container list 1503, the refrigerator 1000 may determine the container D as an unregistered container. Therefore, the refrigerator 1000 may display a GUI associated with registration of the container D on the n-th image 1504.

An operation in which the refrigerator 1000 displays a GUI associated with registration of a container will be described in detail with reference to FIGS. 16 to 18.

Figure 16:
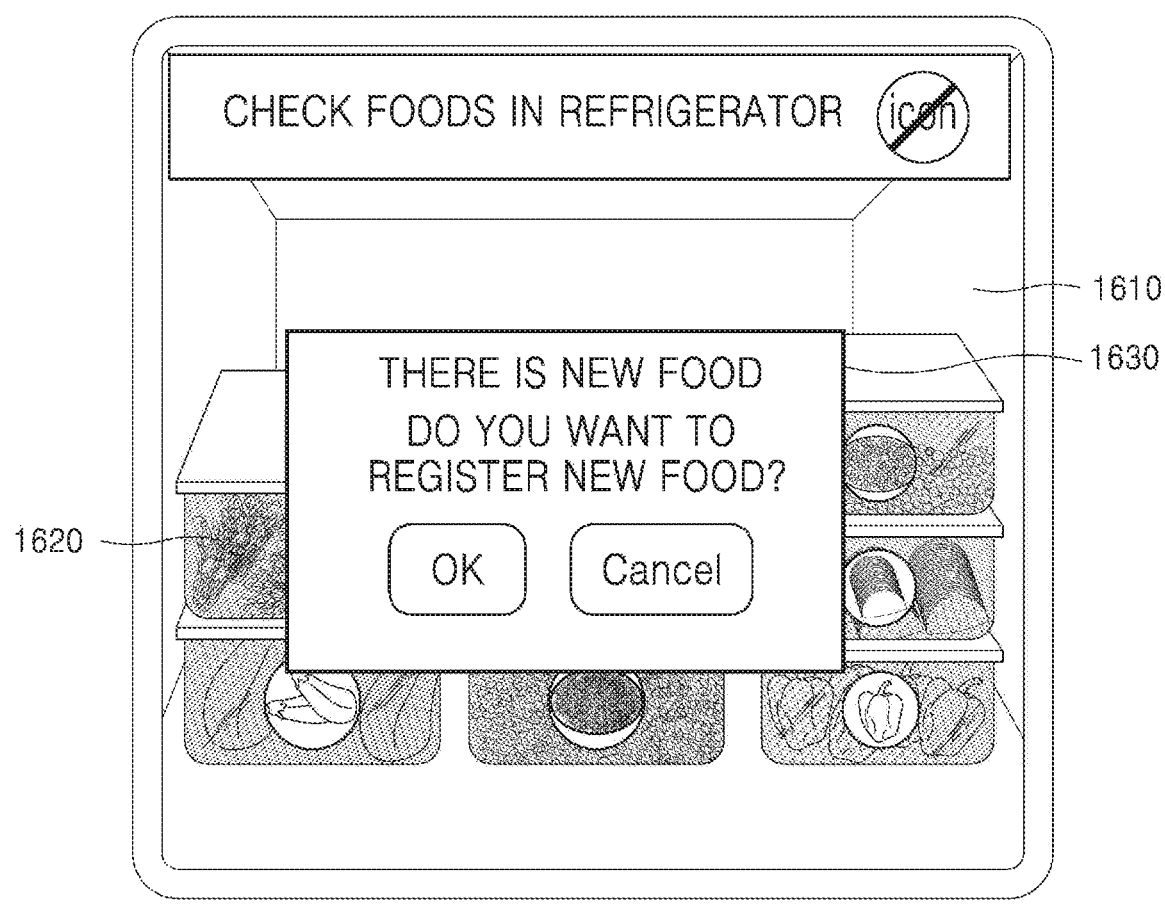
FIGS. 16 and 17 are views for explaining an operation in which a refrigerator registers a recognized new container according to an embodiment.
Figure 17:
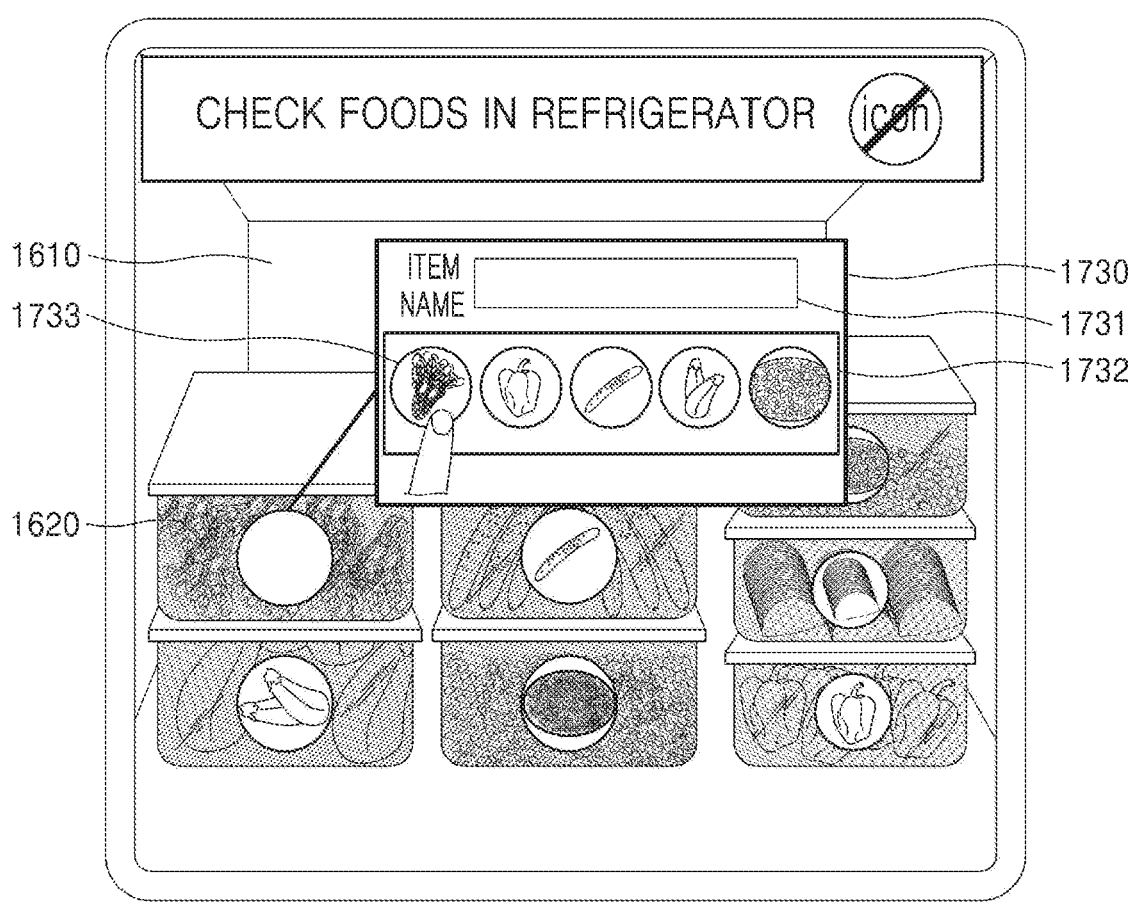

FIGS. 16 and 17 are views for explaining an operation in which a refrigerator registers a recognized new container, according to an embodiment.

Referring to FIG. 16, the refrigerator 1000 may obtain a camera image 1610 captured by photographing the inside of the refrigerator 1000. The refrigerator 1000 may analyze the camera image 1610 to identify pre-registered containers and recognize an un-registered container.

For example, the refrigerator 1000 may recognize a new container (e.g., a bottle containing spinach herbs) 1620 that is not included in the registered container list. In this case, the refrigerator 1000 may display a GUI 1630 associated with registration of the new container 1620 on the camera image 1610, but embodiments are not limited thereto. The GUI 1630 associated with the registration of the new container 1620 may be displayed on an area different from an area where the camera image 1610 is displayed.

For example, the refrigerator 1000 may display a GUI 1630 including a query content 'There is a new food. Do you want to register the new food?'. In this case, when a user selects a button 'OK', a registration procedure for the new container 1620 may be performed.

Referring to FIG. 17, the refrigerator 1000 may display a window 1730 including an item name field 1731 and an identification image field 1732 in response to the user's selection of the button 'OK'. The user may directly input text indicating the content of the new container 1620 into the item name field 1731 in the window 1730. For example, the user may input 'spinach' into the item name field 1731.

The user may select an identification image representing the content of the new container 1620 through the identification image field 1732. For example, the refrigerator 1000 may provide a list of various types of icons to the identification image field 1732 and receive a user input for selecting one icon in the list of various types of icons. For example, the refrigerator 1000 may receive a user input for selecting a spinach icon 1733.

According to an embodiment, the refrigerator 1000 may store information about the new container 1620 in a registered container list, based on a user input through the window 1730. For example, the refrigerator 1000 may match the image of the new container 1620, an item name (e.g., spinach), and an identification image (e.g., the spinach icon 1733) to each other and store a result of the matching.

According to an embodiment, the refrigerator 1000 may add an identification image (e.g., the spinach icon 1733) onto the new container 1620 on a camera image when registration for the new container 1620 is completed.

Hereinafter, a procedure of manually registering a new container when the refrigerator 1000 may not automatically recognize the new container will be described with reference to FIG. 18.

Figure 18:
FIG. 18 is a view for explaining an operation in which a refrigerator registers an unrecognized new container according to an embodiment.

FIG. 18 is a view for explaining an operation in which a refrigerator registers an unrecognized new container, according to an embodiment.

Referring to FIG. 18, the refrigerator 1000 may obtain a camera image 1810 including a plurality of containers by using a camera arranged in the refrigerator 1000. In this case, the image of a first container 1820 which is newly stored in the refrigerator 1000 by the user may also be included in the camera image 1810.

However, when the refrigerator 1000 fails to recognize the first container 1820 which is an unregistered container, the user may manually perform a registration procedure for the first container 1820. For example, the user may touch the first container 1820 on the camera image 1810. In this case, the refrigerator 1000 may display a GUI 1830 associated with registration of the first container 1820 on which an identification image is not displayed. For example, the GUI 1830 may include a query content Do you want to register new food?'. When the user selects a button 'OK', a registration procedure for a new container may be performed. For example, as shown in FIG. 17, the refrigerator 1000 may display a window 1730 including an item name field 1731 and an identification image field 1732 in response to the user's selection of the button 'OK'. The user may directly input text indicating the content of the new container 1620 into the item name field 1731 in the window 1730. For example, the user may input 'spinach' into the item name field 1731.

The user may select an identification image representing the content of the first container 1820 through the identification image field 1732. For example, the refrigerator 1000 may provide a list of various types of icons to the identification image field 1732 and receive a user input for selecting one icon in the list of various types of icons. For example, the refrigerator 1000 may receive a user input for selecting a spinach icon 1733.

According to an embodiment, the refrigerator 1000 may store information about the first container 1820 in a registered container list, based on a user input through the window 1730. For example, the refrigerator 1000 may match the image of the first container 1820, an item name (e.g., spinach), and an identification image (e.g., the spinach icon 1733) to each other and store a result of the matching.

Figure 19:
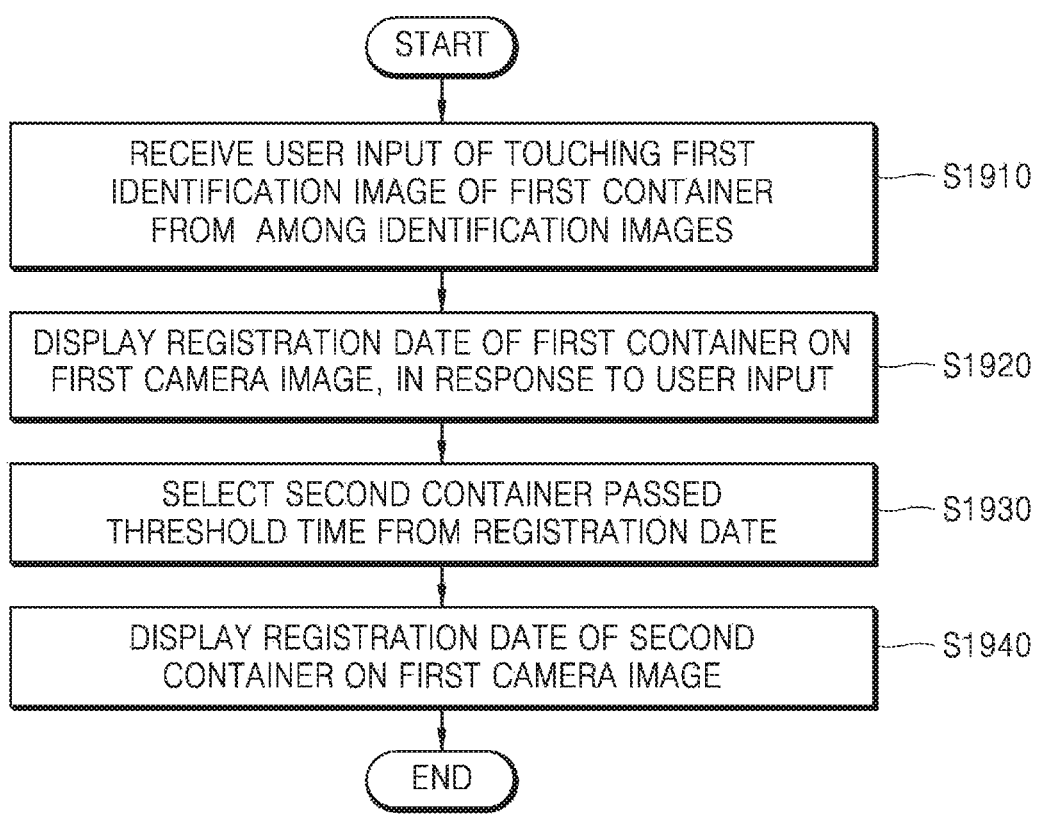
FIG. 19 is a flowchart of a method of displaying the registration date of a container according to an embodiment.

FIG. 19 is a flowchart of a method of displaying the registration date of a container, according to an embodiment.

In operation S1910, the refrigerator 1000 according to an embodiment may receive a user input of touching a first identification image of a first container from among identification images.

According to an embodiment, the refrigerator 1000 may sense a user input of touching a first identification image (e.g., a first icon) of a first container on a first camera image. The user input of touching the first identification image may vary. For example, the user input may be an input of touching the first identification image for a threshold time (e.g., 3 seconds) or an input for tapping the first identification image a predetermined number of times (e.g., twice), but embodiments are not limited thereto.

In operation S1920, the refrigerator 1000 according to an embodiment may display the registration date of the first container on the first camera image, in response to the user input. The registration date of the first container may refer to a date when the first container starts to be stored in the refrigerator 1000.

According to an embodiment, the refrigerator 1000 may display the registration date of the first container, in relation to the first container. For example, the refrigerator 1000 may display the registration date of the first container on the first container, or may display the registration date of the first container on an area adjacent to the first container.

According to an embodiment, the display of the registration date of the first container may disappear from the first camera image after the first identification image is touched and a predetermined time has elapsed from the registration date thereof.

In operation S1930, the refrigerator 1000 according to an embodiment may select a second container passed a threshold time from the registration date thereof. For example, the refrigerator 1000 may select a second container after two weeks elapses from the registration date thereof.

In operation S1940, the refrigerator 1000 according to an embodiment may display the registration date of the second container on the first camera image.

According to an embodiment, the refrigerator 1000 may display the registration date of the second container, in relation to the second container. For example, the refrigerator 1000 may display the registration date of the second container on the second container, or may display the registration date of the second container on an area adjacent to the second container.

According to an embodiment, the refrigerator 1000 may highlight the registration date of the second container. For example, the refrigerator 1000 may display the registration date of the second container in a different color from the registration dates of the other containers. For example, the refrigerator 1000 may display the registration date of the second container in red. Also, the refrigerator 1000 may display the registration date of the second container in bold.

An operation in which the refrigerator 1000 displays the registration date of a container will be described in more detail with reference to FIG. 20.

Figure 20:
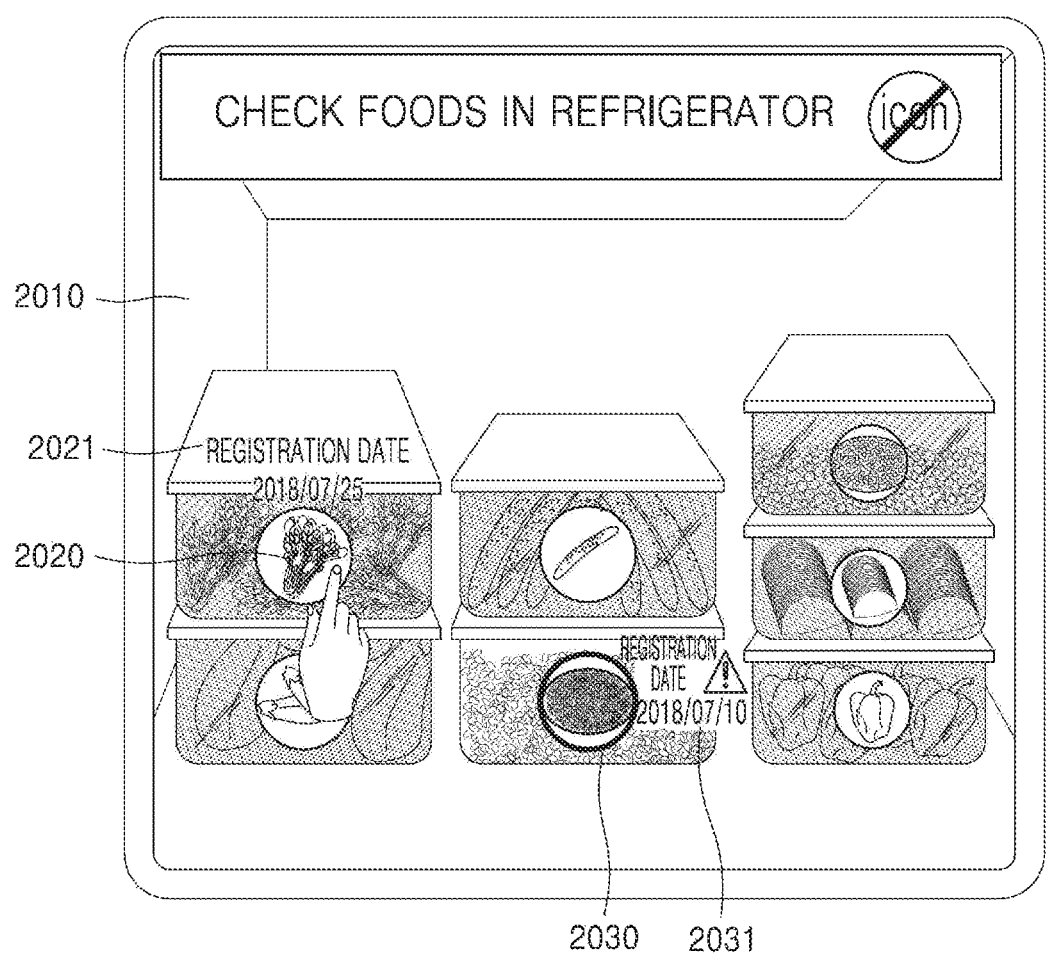
FIG. 20 is a view for explaining an operation in which a refrigerator displays the registration date of a container on a camera image according to an embodiment.

FIG. 20 is a view for explaining an operation in which a refrigerator displays the registration date of a container on a camera image, according to an embodiment.

Referring to FIG. 20, the refrigerator 1000 may obtain a camera image 2010 captured by photographing the inside of the refrigerator 1000 and display the camera image 2010 on a display unit. In this case, when a user wants to know the registration date of a first container 2021 containing spinach herbs, the user may touch a spinach icon 2020 on the first container 2021. In this case, the refrigerator 1000 may display the registration date (e.g., registration date 2018 Jul. 25) of the first container 2021 around the spinach icon 2020 in response to a user input of touching the spinach icon 2020.

When the registration date of a second container 2031 containing fried rice has passed a preset threshold time (e.g., two weeks), the refrigerator 1000 may display the registration date (e.g., registration date 2018 Jul. 10) around a fried rice icon 2030 of the second container 2031. In this case, the refrigerator 1000 may display a warning icon to warn that a long time has elapsed from a registration date, or may highlight the registration date (e.g., registration date 2018 Jul. 10) in red.

According to an embodiment, the user may easily identify and discard a container, which has an earlier registration date, by checking the registration date of the container appearing on the camera image 2010.

Figure 21:
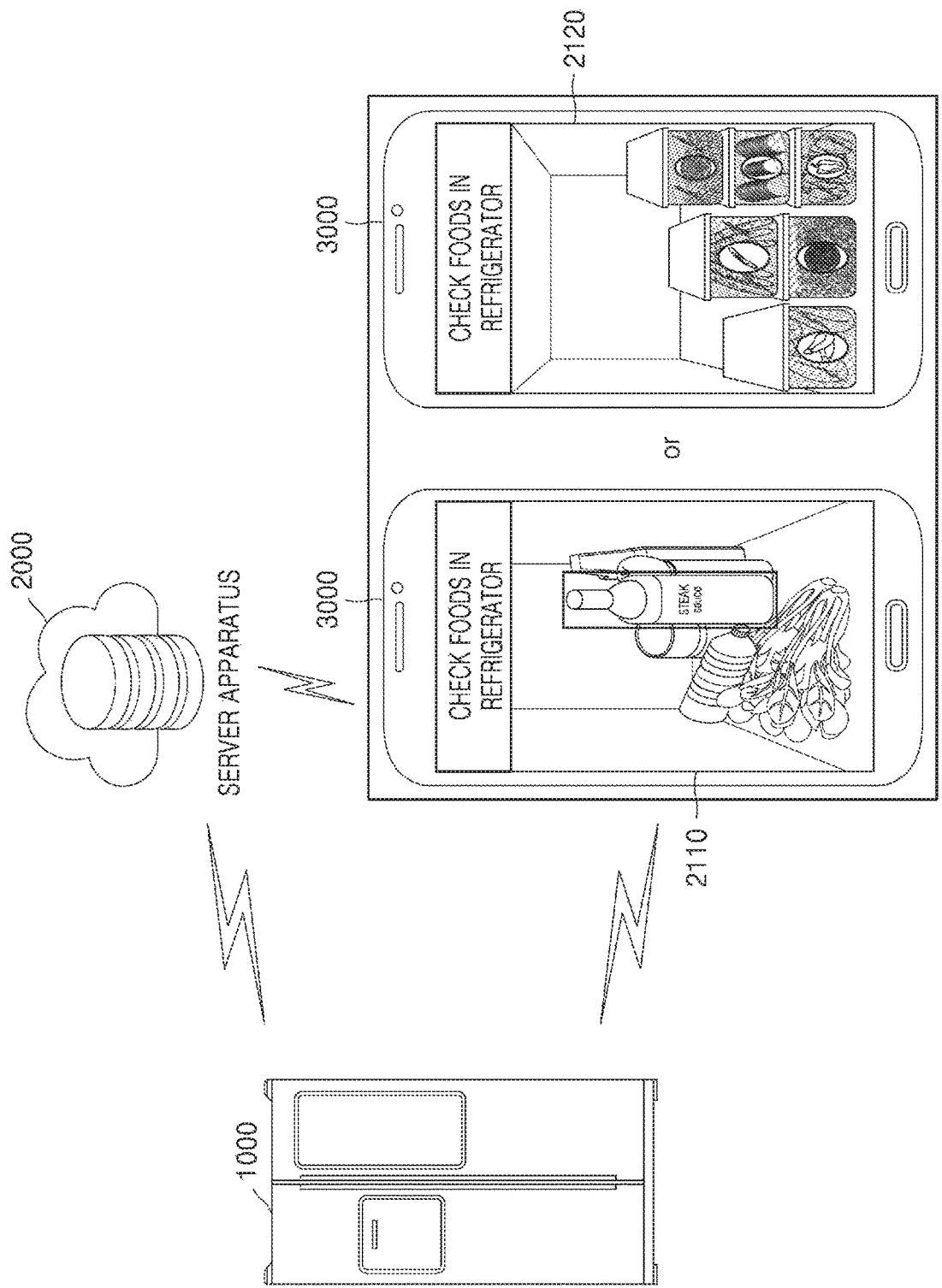
FIG. 21 is a view for explaining an operation in which a mobile terminal provides information about an object in a refrigerator according to an embodiment.

FIG. 21 is a view for explaining an operation in which a mobile terminal provides information about an object in a refrigerator, according to an embodiment.

According to an embodiment, a mobile terminal 3000 may obtain information about an object stored in a refrigerator 1000 from the refrigerator 1000 or a server apparatus 2000 and display the obtained information.

According to an embodiment, the mobile terminal 3000 may provide a first GUI 2110 or a second GUI 2120 through an execution window of a refrigerator application when a user executes the refrigerator application.

Referring to the first GUI 2110, the mobile terminal 3000 may display a camera image captured by photographing objects in the refrigerator 1000. In this case, when a first object in the camera image is obscured by a can and a beverage can and thus is not accurately identified, the user may touch the first object. In this case, the mobile terminal 3000 may display a substitute image 411 of the first object on the camera image by using an AR technique in response to a user input of touching the first object.

Referring to the second GUI 2120, the mobile terminal 3000 may display a camera image captured by photographing containers in the refrigerator 1000. The mobile terminal 3000 may display identification images (e.g., icons) respectively representing the contents of the containers on the camera image. For example, the refrigerator 1000 may display an eggplant icon representing the content (e.g., eggplant) of a first container on the first container, display a fried rice icon representing the content (e.g., fried rice) of a second container on the second container, display a cucumber icon representing the content (e.g., cucumber kimchi) of a third container on the third container, display a paprika icon representing the content (e.g., paprika) of a fourth container on the fourth container, display a pickled radish icon representing the content (e.g., pickled radishes) of a fifth container on the fifth container, and display a bean icon representing the content (e.g., bean) of a sixth container on the sixth container.

Figure 22:
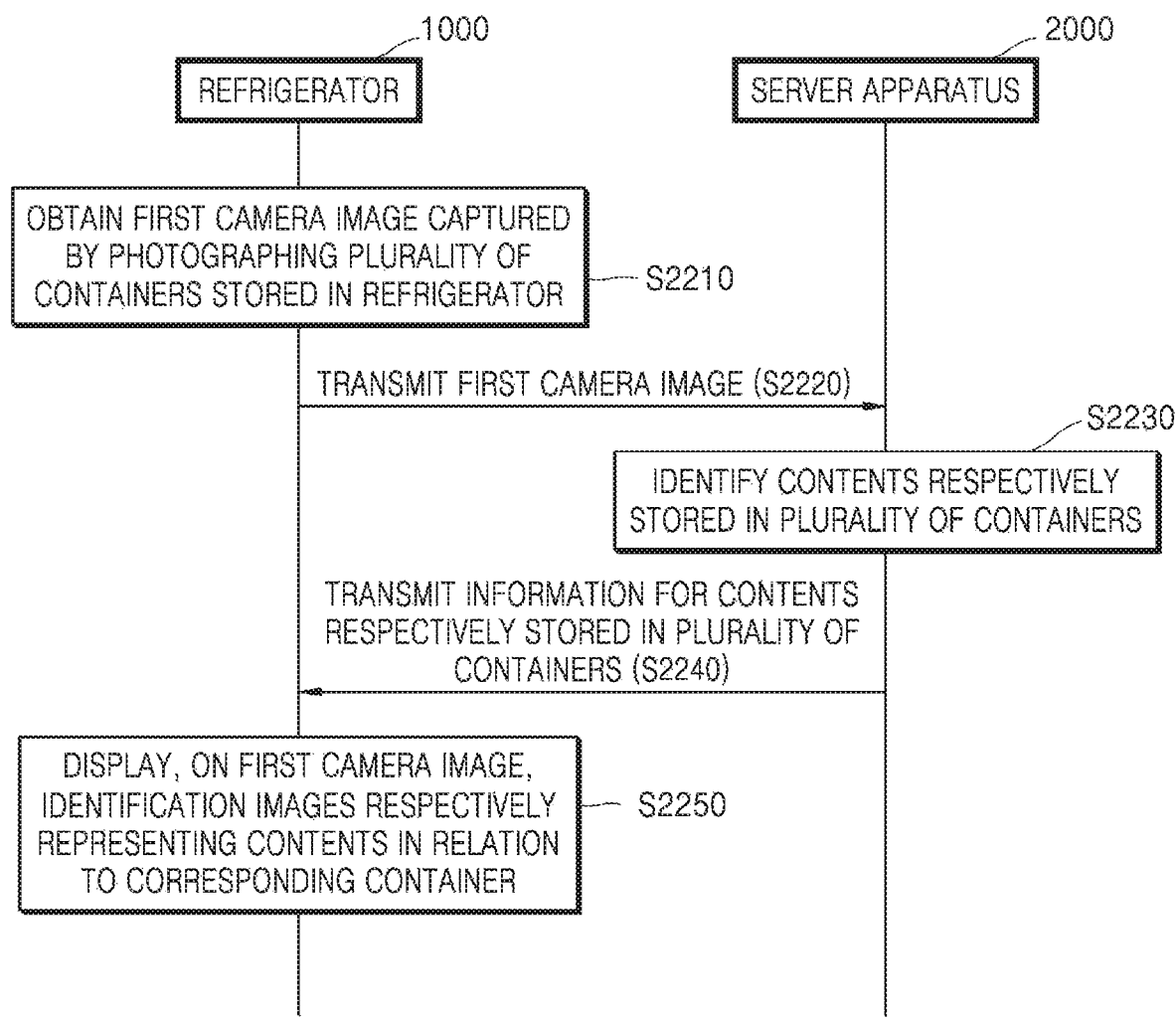
FIG. 22 is a flowchart of a method of providing information about an object in a refrigerator in conjunction with a refrigerator and a server according to an embodiment.

FIG. 22 is a flowchart of a method of providing information about an object in a refrigerator connected to a server, according to an embodiment.

In operation S2210, the refrigerator 1000 according to an embodiment may obtain a first camera image captured by photographing a plurality of containers stored in the refrigerator 1000.

According to an embodiment, the first camera image may be an RGB image or a monochrome image, but embodiments are not limited thereto. According to an embodiment, the camera image may be a two-dimensional image or a three-dimensional image. Because operation S2210 corresponds to operation S1210 in FIG. 12, a detailed description thereof will be omitted.

In operation S2220, the refrigerator 1000 according to an embodiment may transmit the first camera image to the server apparatus 2000.

According to an embodiment, the refrigerator 1000 may transmit identification information of the refrigerator 1000 or user identification information (e.g., account information) to the server apparatus 2000 and may request the server apparatus 2000 to provide information about contents respectively stored in the plurality of containers.

In operation S2230, the server apparatus 2000 according to an embodiment may identify contents respectively stored in the plurality of containers included in the first camera image.

According to an embodiment, the server apparatus 2000 may analyze the first camera image and extract the plurality of containers included in the first camera image. The server apparatus 2000 may compare each of the extracted plurality of containers with registered containers included in a registered container list. For example, the server apparatus 2000 may compare the image of a container extracted from a first camera image with the images of the registered containers included in the registered container list, identify the extracted container, and obtain, from the registered container list, information about a content stored in the extracted container.

In operation S2240, the server apparatus 2000 according to an embodiment may transmit the information about the contents respectively stored in the plurality of containers to the refrigerator 1000.

According to an embodiment, the server apparatus 2000 may transmit the information about the contents respectively stored in the plurality of containers to the refrigerator 1000, based on the identification information of the refrigerator 1000 or the user identification information, received from the refrigerator 1000. For example, the server apparatus 2000 may transmit the item names of the contents and identification icons representing the contents to the refrigerator 1000.

According to an embodiment, when the user's mobile terminal 3000 is registered in the server apparatus 2000, the server apparatus 2000 may transmit the information about the contents respectively stored in the plurality of containers to the user's mobile terminal 3000.

In operation S2250, the refrigerator 1000 according to an embodiment may display, on the first camera image, identification images respectively representing the contents, in relation to a corresponding container.

According to an embodiment, the refrigerator 1000 may display an identification image representing the content of a corresponding container within a predetermined distance from the corresponding container. For example, the refrigerator 1000 may display a first identification image representing the content of a first container on the first container, or may display a first identification image on an area adjacent to the first container.

According to another embodiment, the refrigerator 1000 may connect, by a line, an identification image representing the content of a corresponding container to the corresponding container and display the identification image on the first camera image. For example, the refrigerator 1000 may connect, by a line, the first identification image representing the content of the first container to the first container and display the first identification image.

Figure 23:
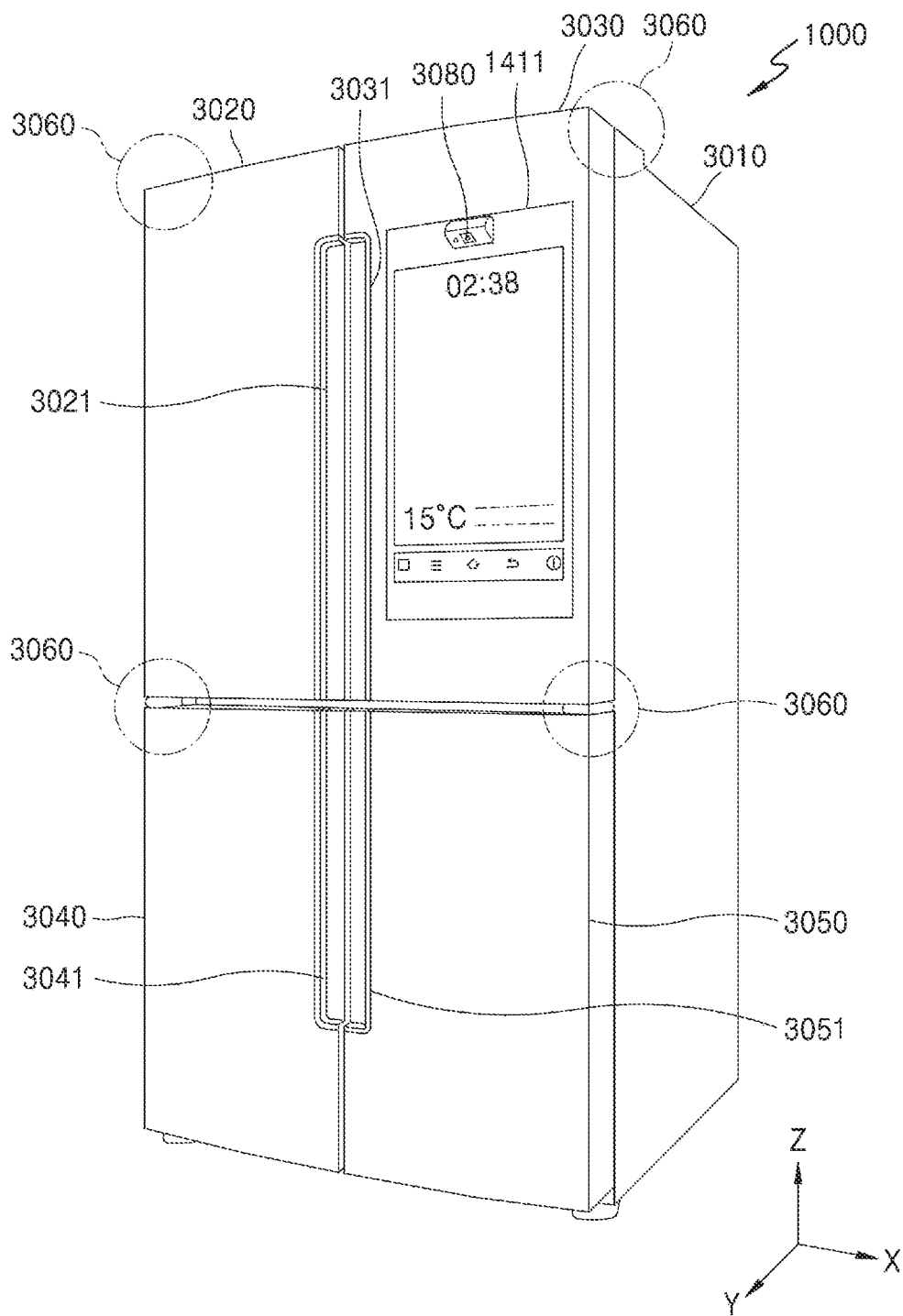
FIGS. 23 and 24 are views for explaining a structure of a refrigerator according to an embodiment.
Figure 24:
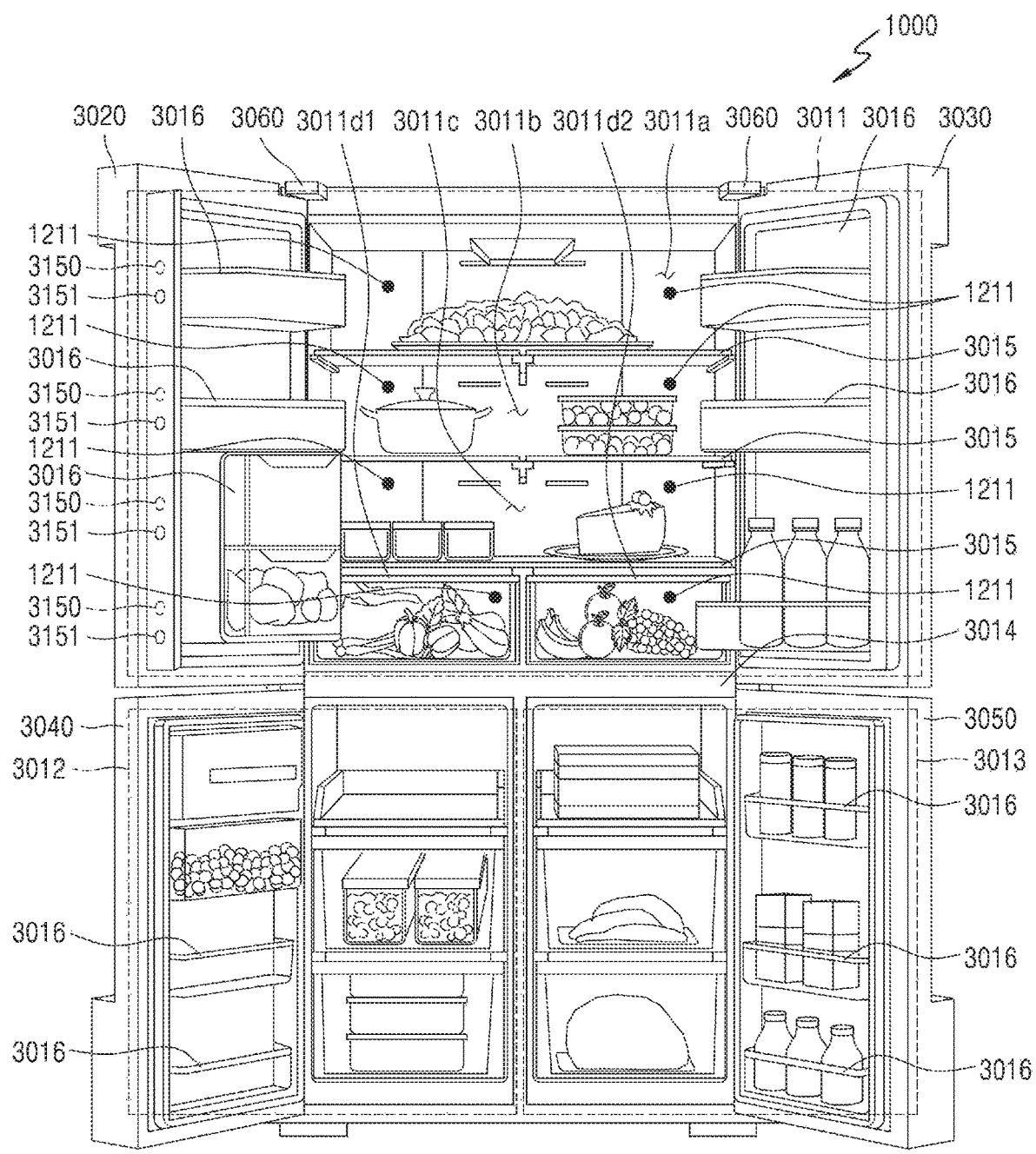

FIGS. 23 and 24 are views for explaining a structure of the refrigerator 1000 according to an embodiment.

Referring to FIGS. 23 and 24, the refrigerator 1000 may include a main body 3010, storerooms 3011, 3012, and 3013, a plurality of doors 3020, 3030, 3040, and 3050, and a hinge 3060 connecting each of the doors 3020, 3030, 3040, and 3050 to the main body 3010. The display 1411 displaying content may be located on at least one door (for example, at least one of a second door 3030 on the right side or a first door 3020 on the left side) from among the plurality of doors 3020, 3030, 3040, and 3050.

A camera (or a front camera 3080) may be located in at least one door (for example, at least one of the second door 3030 on the right side or the first door 3020 on the left side) from among the plurality of doors 3020, 3030, 3040, and 3050. A proximity sensor may be located to be adjacent (for example, within a radius of 500 mm) to the front camera 3080. Also, a microphone may be located in at least one door (for example, at least one of the second door 3030 on the right side or the first door 3020 on the left side) from among the plurality of doors 3020, 3030, 3040, and 3050.

The refrigerator 1000 may have different arrangements of storerooms and doors. In the case of a top mounted freezer (TMP) type refrigerator, a freezing room may be formed above and a refrigerating room may be formed below. However, in the case of a bottom mounted freezer (BMF) type refrigerator, a refrigerating room may be formed above and a freezing room may be formed below. A side by side (SBS) type refrigerator may have a freezing room on the left side (or the right side) and a refrigerating room on the right side (or on the left side). A French door refrigerator (FDR) type refrigerator may be divided into an upper portion and a lower portion by a partition, and a refrigerating room may be formed in the upper portion and a freezing room may be formed in the lower portion, wherein the refrigerating room in the upper portion may be opened and closed by a pair of doors. Also, in the case of the FDR type refrigerator, both of the refrigerating room in the upper portion and the freezing room in the lower portion may be opened and closed by a pair of doors.

The main body 3010 may include an inner case forming the storerooms 3011 through 3013, an outer case forming an exterior of the refrigerator 1000, and an insulator keeping a temperature difference between the inner case and the outer case. The insulator may prevent cold air in the storerooms 3011 through 3013 from being discharged to the outside and hot air from the outside of the storerooms 3011 through 3013 from being introduced into the storerooms 3011 through 3013.

The main body may include a cold air supply configured to supply cold air to the storerooms 3011 through 3013. The cold air supply may include a compressor 3181 to compress a refrigerant, a condenser, an expansion valve, an evaporator, and a pipe.

The storerooms 3011 through 3013 may be divided by a partition 3014. The storerooms 3011 through 3013 may be divided into freezing storerooms 3012 and 3013 (hereinafter, referred to as "freezing rooms") below and a cooling storeroom 3011 (hereinafter, referred to as a "refrigerating room") above the freezing storerooms 3012 and 3013. The storerooms 3011 through 3013 may be set to have temperatures above zero (for example, between 0° C. and 7° C., or below zero (for example, between −5° C. and −1° C.) and may accommodate water, beverages, food stuffs, chilled foods, or frozen foods. Water or beverages may be accommodated in a beverage container.

The refrigerating room 3011 among the storerooms 3011 through 3013 divided by the partition 3014 may include one or more shelves 3015 and one or more storage boxes 3016.

The refrigerating room 3011 is coupled to the first door 3020 located at one side (for example, the left side) of the refrigerating room 3011 and the second door 3030 adjacent to the first door 3020 and located at the other side (for example, the right side) of the refrigerating room 3011. The first door 3020 and/or the second door 3030 may rotate at an angle (for example, an angle equal to or less than 300°) set by the hinge 3060 corresponding to each of the first door 3020 and the second door 3030, to open and close (for example, to be coupled to or separated from) a front surface of refrigerating room 3011. The first door 3020 may rotate in a direction opposite to a direction in which the second door 3030 rotates, to open and close the refrigerating room 3011. Locations of the first door 3020 and the second door 3030 may be changed with each other.

The first door 3020 may rotate at the angle (for example, the angle equal to or less than 300°) set by the hinge 3060 to open and close a portion (for example, between 35% and 70% of the front surface of the refrigerating room 3011) of the front surface of the refrigerating room 3011.

A dispenser providing water, ice, or sparkling water and/or a handle 3021 which may be grasped may be located at the front surface (for example, a +y axis directions) of the first door 3020.

The second door 3030 may rotate at the angle (for example, the angle equal to or less than 300°) set by the hinge 3060 to open and close a portion (for example, between 35% and 70% of the front surface of the refrigerating room 3011) of the front surface of the refrigerating room 3011. The second door 3030 may include a handle 3031 which may be grasped. The handle 3021 of the first door 3020 and the handle 3031 of the second door 3030 may be located at the left side and the right side to be apart from each other based on the central area of the refrigerating room 3011.

The display unit 1411 may be located at the front surface (for example, a +y axis direction) of the second door 3030. The display 1411 may display functions and stored settings of the refrigerator 1000. The display 1411 may be a touch screen display and may receive a user's input (for example, a touching operation or an operation of selecting a button). Here, the button may be included in the display 1411 or may be separate from the display unit 1411. The button may include a software button and a hardware button. The display 1411 may display (or execute) a screen of an application (including a widget).

Vegetable boxes 3011d1 and 3011d2 may be located below the refrigerating room 3011. The vegetable boxes 3011d1 and 3011d2 may be withdrawn (for example, slide or rolled) forward (for example, a y axis direction).

The storerooms 3012 and 3013 may have the doors 3040 and 3050 at sides thereof. The storerooms 3012 and 3013 may be integrated into one storeroom (for example, like the refrigerating room 3011). Also, the refrigerator 1000 may have a drawer.

The refrigerator 1000 may include an inner camera 3150 to capture the inside space of the refrigerator 1000, a spectrometric camera 3151 to obtain a spectrometric image in the refrigerator 1000, and an environmental sensor 1211 (for example, an odor sensor, a temperature sensor, or a humidity sensor).

Figure 25:
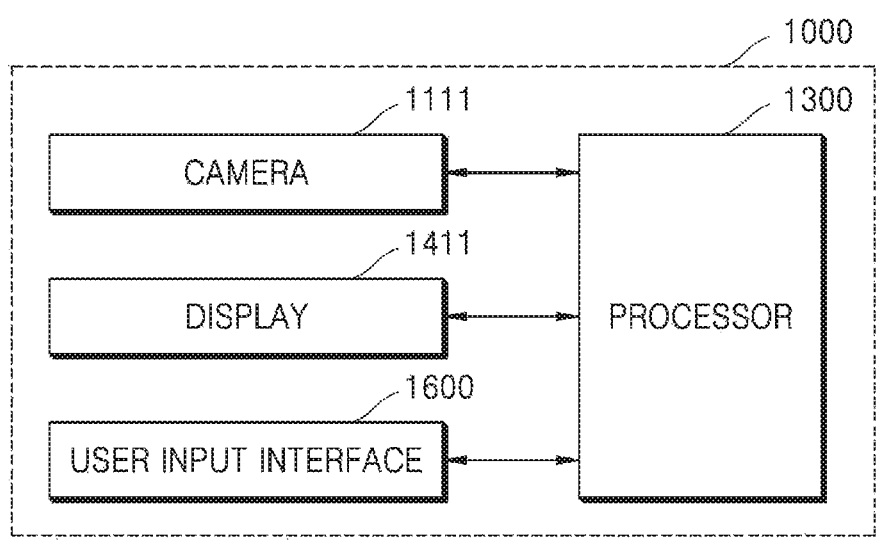
FIGS. 25 and 26 are block diagrams for explaining functions of a refrigerator according to an embodiment.
Figure 26:
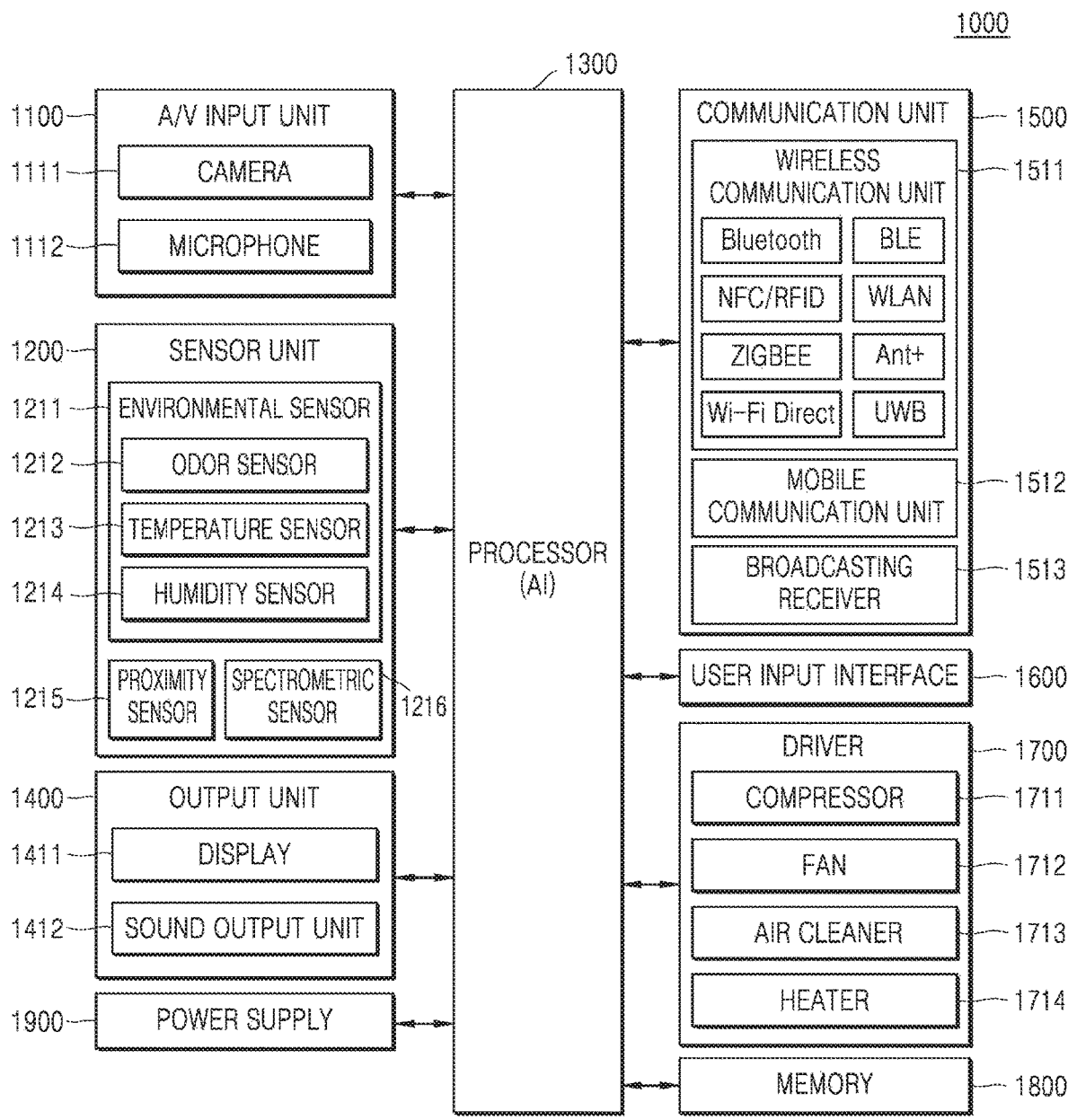

FIGS. 25 and 26 are block diagrams for explaining functions of the refrigerator 1000 according to an embodiment.

As illustrated in FIG. 25, the refrigerator 1000 according to an embodiment may include a camera 1111, a display 1411, a processor 1300, and a user input interface 1600. However, not all illustrated components are essential components. The refrigerator 1000 may be realized by including more or less components than the illustrated components. For example, the refrigerator 1000 according to an embodiment may be realized with the processor 1300 and a memory 1800. In addition, as illustrated in FIG. 26, the refrigerator 1000 according to an embodiment may include an audio/video (A/V) input unit 1100, a sensor unit 1200, a processor 1300, an output unit 1400, a communication unit 1500, a user input interface 1600, a driver 1700, a memory 1800, and a power supply 1900.

Hereinafter, the components above will be sequentially described.

The A/V input unit 1100 may be included for an input of an audio signal or a video signal and may include the camera 1111, a microphone 1112, etc. The camera 1111 may obtain an image frame, such as a still image or a video, via an image sensor. The image captured by the image sensor may be processed by the processor 1300 or an additional image processing interface.

According to an embodiment, the camera 1111 may include an outer camera to photograph an outer environment and an inner camera 3150 to photograph an inner environment. The inner camera 3150 to photograph the inner environment may be provided in a multiple number. The camera 1111 may obtain a camera image (for example, RGB) including at least one object stored in the refrigerator 1000 via the inner camera 3150.

The microphone 1112 may receive an external sound signal and process the external sound signal into electrical sound data. For example, the microphone 1112 may receive a sound signal (for example, a voice command) from an external device or a speaker. The microphone 1112 may use various noise removal algorithms to remove noise occurring in the process of receiving the external sound signal.

The sensor unit 1200 may include at least one of the environmental sensor 1211, a proximity sensor 1215, or a spectrometric sensor 1216, but embodiments are not limited thereto. The environmental sensor 1211 may be a sensor to obtain the environmental information in the refrigerator 1000 and may include at least one of an odor sensor 1212, a temperature sensor 1213, or a humidity sensor 1214. The spectrometric sensor 1216 may be a spectrometric camera 3151 of FIG. 24. The function of each of the sensors may be intuitively inferred by one of ordinary skill in the art from its name, and thus, its detailed description will be omitted.

The processor 1300 may generally control general operations of the refrigerator 1000. For example, the processor 1300 may execute programs stored in the memory 1800 to generally control the A/V input unit 1100, the sensor unit 1200, the output unit 1400, the communication unit 1500, the user input interface 1600, the driver 1700, the memory 1800, the power supply 1900, etc.

According to an embodiment, the processor 1300 may include an AI processor configured to generate a learning network model, but embodiments are not limited thereto. According to an embodiment, the AI processor may be realized as a chip separate from the processor 1300. According to an embodiment, the AI processor may be a general-purpose chip.

According to an embodiment, the processor 1300 may display a substitute image of a first object on the display 1411 in response to a first user input for selecting the first object of a plurality of objects. The processor 1300 may receive a second user input for rotating the substitute image through the user input interface 1600 and display the rotated substitute image on the display 1411 in response to the second user input. The processor 1300 may receive a third user input for requesting detailed information about the first object through the user input interface 1600 and output the detailed information about the first object to the display 1411 in response to the third user input.

According to an embodiment, the processor 1300 may perform an operation of obtaining a first camera image, captured by photographing a plurality of containers stored in the refrigerator 1000 through the camera 1111 arranged in the refrigerator 1000, by executing one or more instructions stored in the memory 1800. According to an embodiment, the processor 1300 may identify the contents respectively stored in the plurality of containers included in the first camera image and display identification images respectively representing the contents on the first camera image, in relation to a corresponding container.

According to an embodiment, the processor 1300 may obtain a second camera image, captured by photographing a plurality of containers stored in the refrigerator 1000, after obtaining the first camera image and track a movement position of each of the plurality of containers in the refrigerator 1000 by using the second camera image. The processor 1300 may display identification images respectively representing the contents of the containers, in relation to the movement position of a corresponding container, based on a result of the tracking.

According to an embodiment, the processor 1300 may compare each of the plurality of containers included in the first camera image with registered containers included in a registered container list and determine a first container of the plurality of containers as an unregistered container based on a result of the comparing. In this case, the processor 1300 may display a GUI associated with the registration of the first container on the display 1411.

The output unit 1400 may be included to output an audio signal, a video signal, or a vibration signal and may include the display 1411, a sound output unit 1412, a vibration motor, etc.

When the display 1411 and a touch pad are layered to form a touch screen, the display 1411 may be used as an input device as well as the output device. The display 1411 may include at least one of a liquid crystal display, a thin film transistor-liquid crystal display, an organic light-emitting diode, a flexible display, a three-dimensional (3D) display, or an electrophoretic display. Also, according to a form in which the refrigerator 1000 is realized, the refrigerator 1000 may include two or more displays 1411.

According to an embodiment, the display 1411 may display a camera image captured by photographing a plurality of objects stored in the refrigerator 1000. The display 1411 may display a substitute image of an object selected by a user on the camera image or on an area adjacent to the camera image. The display 1411 may display an identification image representing the contents of a container on the camera image.

The sound output unit 1412 may output audio data received from the communication unit 1500 or stored in the memory 1800. Also, the sound output unit 1412 may output sound signals related to functions (for example, a call signal reception sound, a message reception sound, a notification sound, etc.) performed by the refrigerator 1000. The sound output unit 1412 may include a speaker, a buzzer, etc.

The communication unit 1500 may include one or more components to enable communication between the refrigerator 1000 and the server apparatus 2000 and between the refrigerator 1000 and the mobile terminal 3000. For example, the communication unit 1500 may include a short-range wireless communication unit 1511, a mobile communication unit 1512, and a broadcasting receiver 1513.

The short-range wireless communication unit 1511 may include a Bluetooth communication unit, a Bluetooth low energy (BLE) communication unit, a near-field communication unit, a wireless local area networking (WLAN) communication unit (i.e., a Wi-Fi communication unit), a Zigbee communication unit, an infrared data association (IrDA) communication unit, a WFD (Wi-Fi direct) communication unit, an ultra-wideband (UWB) communication unit, an Ant+ communication unit, etc., but embodiments are not limited thereto.

The mobile communication unit 1512 may transmit and receive wireless signals to and from at least one of a base station, an external terminal, or a server, in a mobile communication network. Here, the wireless signals may include a voice call signal, a video telephony call signal, or various types of data according to exchange of text/multimedia messages.

The broadcasting receiver 1513 may receive broadcasting signals and/or information related to broadcasting from the outside via broadcasting channels. The broadcasting channels may include a satellite channel and a ground wave channel. According to an embodiment, the refrigerator 1000 may not include the broadcasting receiver 1513.

The user input interface 1600 denotes a component through which a user may input data for controlling the refrigerator 1000. For example, the user input interface 1600 may include a key pad, a dome switch, a touch pad (a touch capacitance method, a pressure resistive method, an infrared detection method, a surface ultrasonic conductive method, an integral tension measuring method, a piezo effect method, etc.), a jog wheel, a jog switch, etc., but embodiments are not limited thereto.

According to an embodiment, the user input interface 1600 may receive a first user input for selecting a first object from among the plurality of objects included in the camera image. Also, the user input interface 1600 may receive a second user input for rotating the substitute image and a third user input for requesting detailed information about the first object.

The driver 1700 may include at least one of a compressor 1711, a fan 1712, an air cleaner 1713, or a heater 1714, which operate under control of the processor 1300. The driver 1700 may further include illuminator (or a deodorizer).

The compressor 1711 may compress a refrigerant which is a working fluid of a freezing cycle under control of the processor 1300. The freezing cycle may include a condenser to convert the refrigerant in a state of gas compressed by the compressor 1711 into the refrigerant in a state of liquid, an inflator to decompress the refrigerant in the state of liquid, and an evaporator to vaporize the decompressed refrigerant in the state of liquid. The processor 1300 may control temperatures of the storerooms through the vaporization of the refrigerant in the state of liquid. Also, the refrigerator 1000 may control the temperatures of the storerooms by using a Peltier device using the Peltier effect and a magnetic cooling device using the magnetocaloric effect.

The fan 1712 may circulate external air under control of the processor 1300. The air heated by the refrigerating cycle may be thermally exchanged through the external air to be cooled.

The air cleaner 1713 may sterilize storerooms or remove germs floating therein under control of the processor 1300. The air cleaner 1713 may include an ion sterilizer.

The heater 1714 may remove generated frost under control of the processor 1300. The heater 1714 may include a defrosting heater.

The memory 1800 may store programs for processing and controlling operations of the processor 1300 and store input/output data (for example, the camera image, the registration date, the registered object list, the registered container list, etc.).

The memory 1800 may include at least one type of storage medium from among a flash memory type memory, a hard disk type memory, a multimedia card micro type memory, a card type memory (for example, an SD or XD memory), dynamic random-access memory (DRAM), static RAM (SRAM), read-only memory (ROM), electrically erasable programmable ROM (EEPROM), programmable ROM (PROM), a magnetic memory, a magnetic disk, or an optical disk. The programs stored in the memory 1800 may be divided into a plurality of modules according to their functions.

The power supply 1900 may supply power to the components of the refrigerator 1000 under control of the processor 1300. The power supply 1900 may supply power input from an external power source via a power code to each of the components of the refrigerator 1000 under control of the processor 1300.

The method according to an embodiment may be implemented in the form of a program command that may be executed through various computer means, and may be recorded in a computer-readable recording medium. The computer-readable recording medium may include program commands, data files, data structures, and the like, alone or in combination. The program commands recorded on the computer-readable recording medium may be those specially designed and configured for the disclosure or may be available to one of ordinary skill in the art of computer software. Examples of the computer-readable recording medium may include magnetic media such as hard disks, floppy disks, and magnetic tapes, optical media such as CD-ROMs and DVDs, magneto-optical media such as floptical disks, and hardware devices specifically configured to store and execute program commands, such as ROM, RAM, flash memory, and the like. Examples of the program command include machine language code such as one produced by a compiler, as well as high-level language code that may be executed by a computer using an interpreter or the like.

The one or more embodiments may be embodied as a recording medium including instructions executable by a computer, such as program modules executed by computers. The computer-readable medium may include any usable medium that may be accessed by computers and may include volatile and non-volatile media, and detachable and non-detachable media. Also, the computer-readable medium may include a computer storage medium and a communication medium. The computer storage medium may include all of volatile and non-volatile media, and detachable and non-detachable media which are realized based on any methods and technologies to store information including computer-readable instructions, data structures, program modules, or other data. The communication medium may typically include computer-readable instructions, data structures, program modules, other data of modified data signals, such as carrier waves, other transmission mechanisms, or other information transmission media. Also, the one or more embodiments may be embodied as a computer program or a computer program product including instructions executable by a computer.

While the embodiments of the disclosure have been described in detail, it will be understood by one of ordinary skill in the art that various changes in form and details may be made therein without departing from the spirit and scope of the disclosure as defined by the following claims.

What is claimed is:

1. A method of providing information about an object in a refrigerator, the method comprising:
    obtaining, using a camera, an image of a plurality of objects stored in the refrigerator;
    displaying the image on a display of the refrigerator;
    receiving a first user input indicating a first object, from among the plurality of objects included in the image, wherein a portion of the first object is obscured by at least one of the plurality of objects included in the image;
    obtaining a first substitute image of a first side of the first object from a registered object list based on the first user input, wherein the first substitute image of the first object includes an object image corresponding to the obscured portion of the first object;
    displaying the first substitute image of the first object on the display;
    identifying an inclination between a horizontal line and a line from a touch start point to a touch end point of a second user input;
    obtaining and displaying a second substitute image of a second side of the first object based on the inclination corresponding to a first angular range; and
    obtaining and displaying a third substitute image of a third side of the first object based on the inclination corresponding to a second angular range.

2. The method of claim 1, wherein the displaying the first substitute image of the first object comprises:
    superimposing and displaying the first substitute image of the first object on the display at a location of the image that comprises the first object.

3. The method of claim 1,
    wherein the first object is in a horizontal orientation in the image, and
    wherein the first object is in a vertical orientation in the first substitute image.

4. The method of claim 1, further comprising:
    identifying at least one object of which an expiration date is within a preset time limit from among the plurality of objects; and
    displaying, on the image displayed on the display, information indicating the expiration date and the at least one object.

5. The method of claim 1, wherein the receiving the first user input comprises identifying the first object by comparing a first portion of the image corresponding to the first user input with a plurality of object images provided in the registered object list,
    wherein the registered object list comprises a plurality of entries respectively corresponding to the plurality of objects, wherein each of the plurality of entries comprises an item name and a registered object image from among the plurality of object images, and
    wherein the method further comprises updating the registered object list based on the image.

6. The method of claim 5, wherein the updating the registered object list comprises:
    identifying a new object has been additionally stored in the refrigerator based on the image;
    performing an optical character recognition operation on the image to identify a new item name; and
    adding a new entry to the registered object list, the new entry comprising the new item name and a new object image.

7. The method of claim 1, wherein the obtaining the image is performed based on a predetermined period of time elapsing after a door of the refrigerator is closed.

8. The method of claim 7, wherein the predetermined period of time is three seconds.

9. A refrigerator comprising:
a camera configured to obtain an image of a plurality of objects stored in the refrigerator;
a display configured to display the image;
a user input interface configured to receive a first user input indicating a first object from among the plurality of objects included in the image, wherein a portion of the first object is obscured by at least one of the plurality of objects included in the image; and
a processor configured to obtain a first substitute image of a first side of the first object from a registered object list based on the first user input, display the first substitute image of the first object on the display, identify an inclination between a horizontal line and a line from a touch start point to a touch end point of a second user input, obtain a second substitute image of a second side of the first object as a rotated substitute image based on the inclination corresponding to a first angular range, obtain a third substitute image of a third side of the first object as the rotated substitute image based on the inclination corresponding to a second angular range, and display the rotated substitute image on the display, wherein the first substitute image of the first object includes an object image corresponding to the obscured portion of the first object.

10. The refrigerator of claim 9, wherein the processor is further configured to superimpose and display the first substitute image of the first object on the display at a location of the image that comprises the first object.

11. The refrigerator of claim 9, wherein
the first object is in a horizontal orientation in the image, and
wherein the first object is in a vertical orientation in the first substitute image.

12. The refrigerator of claim 9, wherein the processor is further configured to:
identify at least one object of which an expiration date is within a preset time limit from among the plurality of objects; and
display, on the image displayed on the display, information indicating the expiration date and the at least one object.

13. A non-transitory computer readable recording medium storing a program which is executable by a processor to perform a method for controlling a refrigerator that includes a camera and a display, the method comprising:
obtaining, using the camera, an image of a plurality of objects stored in the refrigerator;
displaying the image on the display;
receiving a first user input indicating a first object from among the plurality of objects included in the image, wherein a portion of the first object is obscured by at least one of the plurality of objects included in the image;
obtaining a first substitute image of a first side of the first object from a registered object list based on the first user input, wherein the first substitute image of the first object includes an object image corresponding to the obscured portion of the first object;
displaying the first substitute image of the first object on the display;
identifying an inclination between a horizontal line and a line from a touch start point to a touch end point of a second user input;
obtaining and displaying a second substitute image of a second side of the first object based on the inclination corresponding to a first angular range; and
obtaining and displaying a third substitute image of a third side of the first object based on the inclination corresponding to a second angular range.

14. The non-transitory computer readable recording medium of claim 13, wherein the displaying of the first substitute image of the first object comprises superimposing and displaying the first substitute image of the first object on the display at a location of the image that comprises the first object.

15. The non-transitory computer readable recording medium of claim 13, wherein
the first object is in a horizontal orientation in the image, and
wherein the first object is in a vertical orientation in the first substitute image.

16. The non-transitory computer readable recording medium of claim 13, wherein the method further comprises:
identifying at least one object of which an expiration date is within a preset time limit from among the plurality of objects; and
displaying, on the image displayed on the display, information indicating the expiration date and the at least one object.

* * * * *